(12) United States Patent
Ramachandra et al.

(10) Patent No.: US 11,871,472 B2
(45) Date of Patent: Jan. 9, 2024

(54) METHODS AND APPARATUSES FOR WIRELESS DEVICE TIMER CONFIGURATION

(71) Applicant: Telefonaktiebolaget LM Ericsson (publ), Stockholm (SE)

(72) Inventors: Pradeepa Ramachandra, Linköping (SE); Icaro L. J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 486 days.

(21) Appl. No.: 17/280,481

(22) PCT Filed: Sep. 24, 2019

(86) PCT No.: PCT/SE2019/050914
§ 371 (c)(1),
(2) Date: Mar. 26, 2021

(87) PCT Pub. No.: WO2020/067976
PCT Pub. Date: Apr. 2, 2020

(65) Prior Publication Data
US 2022/0039190 A1 Feb. 3, 2022

Related U.S. Application Data

(60) Provisional application No. 62/737,870, filed on Sep. 27, 2018.

(51) Int. Cl.
*H04W 76/19* (2018.01)
*H04B 17/336* (2015.01)
*H04W 24/10* (2009.01)

(52) U.S. Cl.
CPC .......... *H04W 76/19* (2018.02); *H04B 17/336* (2015.01); *H04W 24/10* (2013.01)

(58) Field of Classification Search
CPC ..... H04W 76/19; H04W 24/10; H04B 17/336
See application file for complete search history.

(56) References Cited

U.S. PATENT DOCUMENTS

| | | | |
|---|---|---|---|
| 2009/0005029 A1* | 1/2009 | Wang | H04W 72/54 455/423 |
| 2010/0240357 A1 | 9/2010 | Wu | |
| 2020/0260346 A1* | 8/2020 | Moon | H04W 76/38 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2, Jun. 2018, 1-791.

(Continued)

*Primary Examiner* — Chae S Lee
(74) *Attorney, Agent, or Firm* — Murphy, Bilak & Homiller, PLLC

(57) ABSTRACT

A wireless device (14) is configured for use in a wireless communication system (10). The wireless device (14) starts a timer (28) (e.g., T312) when each of multiple conditions (30) have been fulfilled and physical layer problems for a serving cell of the wireless device (14) have been detected. The multiple conditions (30) have been fulfilled when one or more events have been triggered for measurements of multiple different types and/or for measurements on multiple different types of signals. The wireless device (14) may initiate a connection re-establishment procedure, or transitioning to an idle state, at expiry of the timer (28).

20 Claims, 23 Drawing Sheets

(56) References Cited

OTHER PUBLICATIONS

Ericsson, "Enhancing the handling of timer T312", 3GPP TSG-RAN WG2#103bis, Tdoc R2-1814323, Chengdu, China, Oct. 8-12, 2018, 1-3.

Mediatek Inc., "TP on Radio Link Monitor Related Actions in 38.331", 3GPP TSG-RAN WG2 #99-bis, R2-1710885, Prague, Czech, Oct. 9-13, 2017, 1-7.

* cited by examiner and physical layer problems to be detected for the timer to start.

METHODS AND APPARATUSES FOR WIRELESS DEVICE TIMER CONFIGURATION

TECHNICAL FIELD

The present application relates generally to a wireless communication system, and relates more particularly to configuration of a timer at a wireless device in such a system.

BACKGROUND

A wireless device monitors the radio link quality of its serving cell. If the quality falls below a certain threshold (Qout), the device's physical layer indicates to higher layers that there is a problem at the physical layer, e.g., by transmitting a so-called out-of-synchronization indication to higher layers. When a certain number (N310) of out-of-synchronization indications occur for the serving cell, the wireless device is said to detect physical layer problems for the serving cell. Upon detecting physical layer problems, the wireless device starts a T310 timer. The T310 timer represents the amount of time that the wireless device will wait to see if the radio link quality of the serving cell recovers, before declaring radio link failure (RLF). When the device declares RLF, the device either initiates a procedure to re-establish a network connection or transitions to an idle state without any network connection.

Although waiting for the radio link quality to recover gives the device a chance to avoid the time-consuming connection re-establishment procedure, it might end up unnecessarily delaying that procedure and hence undesirably interrupt service and increase latency. The wireless device may accordingly be configured with another timer, namely a T312 timer, that can help decrease service interruption time.

The T312 timer is heretofore separately configured for each so-called measurement identity, which identifies a measurement that the wireless device is to perform on a certain object (e.g., carrier frequency) and to report when a certain reporting event (e.g., an A3 event) is met. If the timer T310 is running, the wireless device starts the T312 timer when a measurement report is triggered for the measurement identify for which the T312 timer is configured. When the T312 timer expires, the wireless device triggers RLF so as to prompt connection re-establishment or idle mode. This may occur even before the T310 timer expires. Effectively, then, the T312 timer may shorten unnecessary delay in connection re-establishment for devices in a handover procedure, while still allowing the device time to receive a handover command.

Configuring the T312 timer separately for each measurement identity advantageously enables the timer to be restricted to only certain types of handovers, such as a handover from a pico cell to a macro cell. However, this also ties the T312 timer to a single measurement reporting event (e.g., an A3 event), so as to restrict the timer's starting condition.

SUMMARY

A wireless device according to some embodiments herein is configured with a timer (e.g., a T312 timer) whose expiration prompts the wireless device to initiate a connection re-establishment procedure or to transition to an idle state. The wireless device is notably configured to start the timer when each of multiple conditions (e.g., multiple measurement reporting events) have been fulfilled and physical layer problems for a serving cell of the wireless device have been detected. In fact, in some embodiments, the multiple conditions have been fulfilled when one or more events have been triggered for measurements of multiple different types (e.g., RSRP and RSRQ) and/or for measurements on multiple different types of signals. By allowing the timer to be started upon fulfillment of multiple conditions in this way, some embodiments herein advantageously provide configuration flexibility. This flexibility may in turn enable network operators to tailor timer configuration so that it reduces service interruption and reduces latency.

More particularly, embodiments herein include a method performed by a wireless device configured for use in a wireless communication system. The method comprises starting a timer when each of multiple conditions have been fulfilled and physical layer problems for a serving cell of the wireless device have been detected. In some embodiments, the multiple conditions have been fulfilled when one or more events have been triggered for measurements of multiple different types and/or for measurements on multiple different types of signals. Regardless, the method may further comprise initiating a connection re-establishment procedure, or transitioning to an idle state, at expiry of the timer.

In some embodiments, the multiple conditions have been fulfilled when one or more events have been triggered for measurements of multiple different types.

In some embodiments, the measurements of multiple different types include two or more of: a signal power measurement, a signal quality measurement, and a signal-to-interference-plus-noise measurement.

In some embodiments, the one or more events include one or more of: (i) an event in which a measurement becomes better or worse than an absolute threshold; (ii) an event in which a measurement on one cell becomes an amount of an offset better than the same measurement on another cell; and (iii) an event in which a measurement on one cell becomes worse than an absolute threshold and the same measurement on another cell becomes better than another absolute threshold.

In some embodiments, the one or more events comprise one or more measurement reporting events.

In some embodiments, the timer is started when physical layer problems for the serving cell have been detected and multiple measurement reports have been triggered by the triggering of the one or more events for measurements of multiple different types and/or for measurements on multiple types of signals.

In some embodiments, the method further comprises receiving configuration information that configures the timer to start when each of the multiple conditions have been fulfilled and physical layer problems for the serving cell have been detected.

In one such embodiment, triggering of the one or more events for measurements of multiple different types and/or for measurements on multiple types of signals triggers the wireless device to send multiple measurement reports. In this case, the configuration information may include a measurement configuration that indicates a combination of reporting configurations for which the timer is applicable, where the reporting configurations in the combination configure triggering of respective ones of the multiple measurement reports.

In another such embodiment, the configuration information includes a reporting configuration, where the reporting configuration indicates the multiple conditions to be fulfilled to start the timer. For example, the configuration information may include a reporting configuration that includes a list of quantities or measurement types corresponding to respective ones of the multiple conditions. In this case, the method may further comprise: (i) determining whether to trigger a measurement report based on a trigger quantity included in the reporting configuration, and (ii) determining whether or not to start the timer based on the list of quantities or measurement types included in the reporting configuration.

In some embodiments, starting the timer comprises starting the timer upon one of the multiple conditions being fulfilled and each of the others of the multiple conditions having already been fulfilled and physical layer problems for the serving cell already having been detected. In other embodiments, starting the timer comprises starting the timer upon physical layer problems for the serving cell being detected and each of the multiple conditions having already been fulfilled.

In some embodiments, an out-of-sync timer at the wireless device is to be started when physical layer problems for the serving cell have been detected. In this case, starting a timer when each of multiple conditions have been fulfilled and physical layer problems for a serving cell of the wireless device have been detected may comprise starting a timer when each of multiple conditions have been fulfilled and the out-of-sync timer is running.

In some embodiments, the timer is configured to be stopped upon physical layer problems for the serving cell having been resolved, upon triggering a handover procedure, upon initiating a connection re-establishment procedure, or upon a expiry of a timer started when physical layer problems for the serving cell have been detected.

In some embodiments, the wireless communication system is a 5G system or a New Radio (NR) system.

Embodiments herein also include a method performed by a network node configured for use in a wireless communication system. The method may comprise transmitting, to a wireless device, configuration information that configures a timer at the wireless device to start when each of multiple conditions have been fulfilled at the wireless device and physical layer problems for a serving cell of the wireless device have been detected by the wireless device. In some embodiments, the multiple conditions have been fulfilled when one or more events have been triggered for measurements of multiple different types and/or for measurements on multiple different types of signals. Regardless, the method may further comprise receiving a connection re-establishment request at expiry of the timer.

In some embodiments, the multiple conditions have been fulfilled when one or more events have been triggered for measurements of multiple different types.

In some embodiments, the measurements of multiple different types include two or more of: a signal power measurement, a signal quality measurement, and a signal-to-interference-plus-noise measurement.

In some embodiments, the multiple measurement reports report measurements of different types of signals.

In some embodiments, one or more events include one or more of: (i) an event in which a measurement becomes better or worse than an absolute threshold; (ii) an event in which a measurement on one cell becomes an amount of an offset better than the same measurement on another cell; and (iii) an event in which a measurement on one cell becomes worse than an absolute threshold and the same measurement on another cell becomes better than another absolute threshold.

In some embodiments, the one or more events comprise one or more measurement reporting events.

In some embodiments, the timer is configured to be started when physical layer problems for the serving cell have been detected and multiple measurement reports have been triggered by the triggering of the one or more events for measurements of multiple different types and/or for measurements on multiple types of signals.

In some embodiments, triggering of the one or more events for measurements of multiple different types and/or for measurements on multiple types of signals triggers the wireless device to send multiple measurement reports. In one such embodiment, the configuration information includes a measurement configuration that indicates a combination of reporting configurations for which the timer is applicable, where the reporting configurations in the combination configure triggering of respective ones of the multiple measurement reports. In other embodiments, the configuration information includes a reporting configuration, where the reporting configuration indicates the multiple conditions to be fulfilled to start the timer. For example, in some embodiments, the configuration information includes a reporting configuration, where the reporting configuration includes a list of quantities or measurement types corresponding to respective ones of the multiple conditions. A trigger quantity included in the reporting configuration is for triggering a measurement report. And the list of quantities or measurement types included in the reporting configuration is for determining whether or not to start the timer.

In some embodiments, an out-of-sync timer at the wireless device is to be started when physical layer problems for the serving cell have been detected. In this case, the configuration information may configure the timer to start when each of multiple conditions have been fulfilled and physical layer problems for a serving cell of the wireless device have been detected by configuring the timer to start when each of multiple conditions have been fulfilled and the out-of-sync timer is running.

In some embodiments, the wireless communication system is a 5G system or a New Radio (NR) system.

Embodiments herein also include corresponding apparatus, computer programs, and carriers (e.g., computer-readable storage mediums). For example, embodiments herein include a wireless device configured for use in a wireless communication system. The wireless device is configured (e.g., via communication circuitry and processing circuitry) to start a timer when each of multiple conditions have been fulfilled and physical layer problems for a serving cell of the wireless device have been detected. In some embodiments, the multiple conditions have been fulfilled when one or more events have been triggered for measurements of multiple different types and/or for measurements on multiple different types of signals. Regardless, the wireless device may further be configured to initiate a connection re-establishment procedure, or transitioning to an idle state, at expiry of the timer.

Embodiments also include a network node configured for use in a wireless communication system. The network node may be configured (e.g., via communication circuitry and processing circuitry) to transmit, to a wireless device, configuration information that configures a timer at the wireless device to start when each of multiple conditions have been fulfilled at the wireless device and physical layer problems for a serving cell of the wireless device have been detected by the wireless device. In some embodiments, the multiple conditions have been fulfilled when one or more events have been triggered for measurements of multiple different types and/or for measurements on multiple different types of signals. Regardless, the network node may further be configured to receive a connection re-establishment request at expiry of the timer.

DETAILED DESCRIPTION

Figure 1:
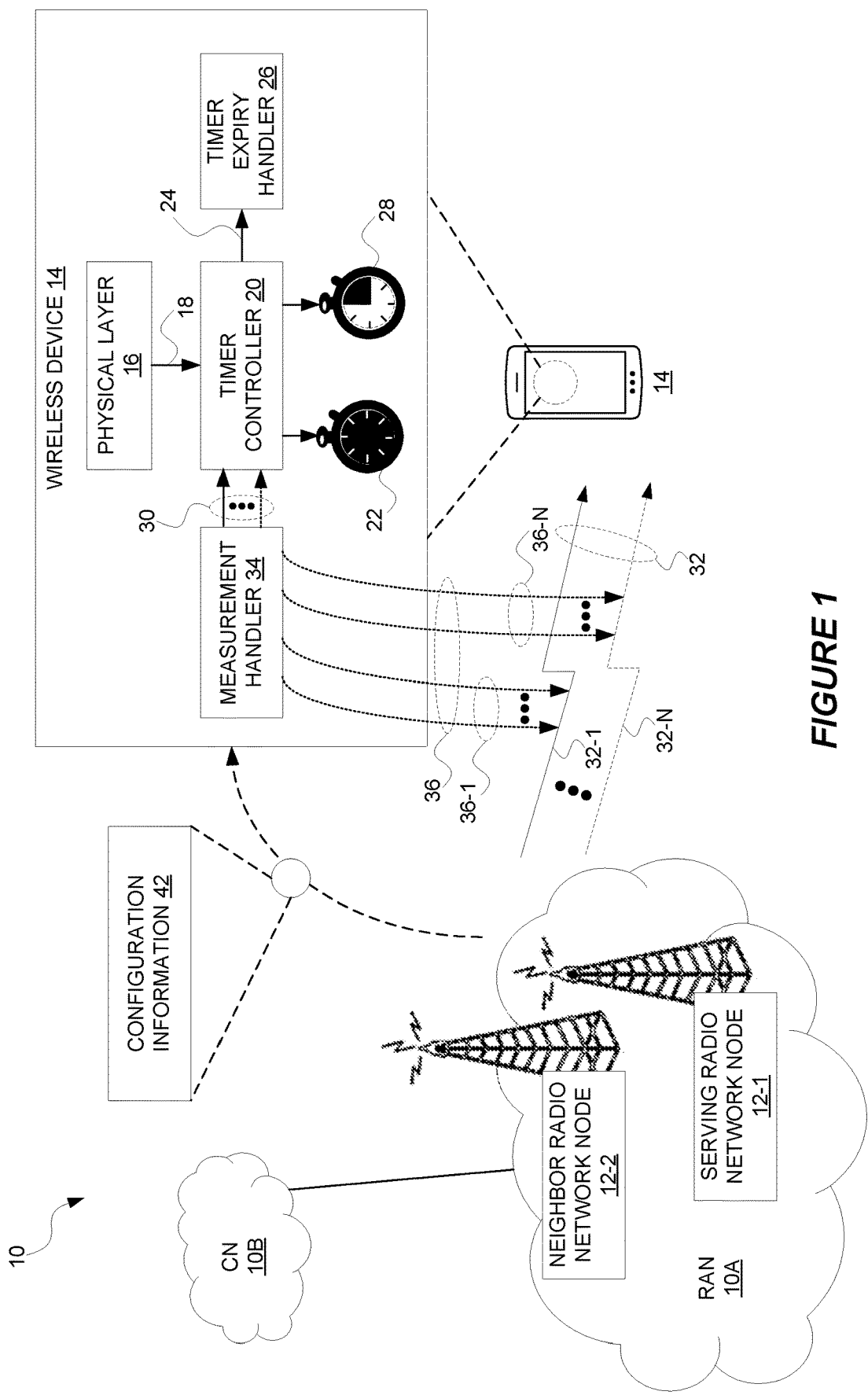
FIG. 1 is a block diagram of a wireless communication system according to some embodiments.

FIG. 1 shows a wireless communication system 10 (e.g., a 5G or New Radio, NR, system) according to some embodiments. The system 10 includes a radio access network (RAN) 10A that provides radio access to one or more wireless devices. The RAN 10A in turn connects the wireless device(s) to a core network (CN) 10B, which connects to one or more data networks such as the Internet.

FIG. 1 in particular shows a serving radio network node 12-1 (e.g., a base station, such as a gNodeB or gNB) that serves a wireless device 14, by providing a serving cell of the wireless device 14. The wireless device 14 is configured to detect when physical layer problems occur for the serving cell, e.g., where physical layer problems are problems that occur in communicating with the serving cell at a physical layer 16 of the wireless device 14.

The wireless device 14 may for instance monitor the radio link quality of the serving cell. If the radio link quality falls below a certain threshold (Qout), the physical layer 16 may transmit an indication 18. The indication 18 may be referred to as an out-of-synchronization indication. When a certain number (e.g., N310) of out-of-synchronization indicators occur for the serving cell, the wireless device 14 is said to detect physical layer problems for the serving cell.

In some embodiments, the indications 18 are transmitted from the physical layer 16 to a timer controller 20, e.g., implemented at a layer higher than the physical layer 16 in the device's protocol stack. The timer controller 20 may be configured to start a timer 22 when physical layer problems are detected for the serving cell. Accordingly, when the timer 22 is running, that means that physical layer problems have been detected for the device's serving cell. The timer 22 may for instance be a T310 timer, e.g., as defined by 3GPP TS 36.331. Regardless, the duration of the timer 22 represents the amount of time that the wireless device 14 will wait to see if the physical layer problems recover, before the wireless device 14 declares radio link failure (RLF). When the timer 22 expires, the timer controller 20 transmits an expiration notification 24 to a timer expiry handler 26. The timer expiry handler 26 may declare RLF upon receiving the expiration notification 24. RLF declaration may in turn trigger the wireless device 14 to initiate a procedure to re-establish a network connection (e.g., a radio resource control, RRC, connection) or transition to an idle state without any network connection. Declaration of RLF may therefore result in service interruption and/or latency.

The wireless device 14 according to embodiments herein is alternatively or additionally configured with another timer shown as timer 28, e.g., for mitigating service interruption and/or latency otherwise attributable to timer 22 under some circumstances. The timer controller 20 is configured to start timer 28 when physical layer problems for the serving cell have been detected (e.g., when timer 22 is running) and when each of multiple conditions 30 have been fulfilled. By allowing the timer 28 to be started upon fulfillment of multiple conditions 30, rather than just a single condition, some embodiments herein advantageously provide configuration flexibility. This flexibility may in turn enable network operators to tailor timer configuration so that it reduces service interruption and reduces latency.

In some embodiments, the multiple conditions 30 are associated with measurements performed by the wireless device 14. More particularly in this regard, the wireless device 14 is configured to receive one or more signals 32-1 . . . 32-N, collectively referred to as signal(s) 32. The signal(s) 32 may be transmitted by the device's serving radio network node 12-1 and/or one or more other radio network nodes in the RAN 10A, such as one or more neighbor radio network nodes 12-2 that provide a cell neighboring the device's serving cell. Regardless, the signal(s) 32 may include one or more types of signals, such as a synchronization signal block (SSB) and/or a channel state information reference signal (CSI-RS).

A measurement handler 34 handles measurement by the wireless device 14 of the signal(s) 32. The wireless device 14 in particular performs multiple measurements 36 of the signal(s) 32. The wireless device 14 may for instance perform one or more measurements 36-1 on signal 32-1 and/or perform one or more measurements 36-N on signal 32-N. Regardless, the measurements 36 may include multiple different types of measurements. For example, the measurements 36 may include two or more of a signal power measurement (e.g., a reference signal received power, RSRP, measurement), a signal quality measurement (e.g., a reference signal received quality, RSRQ, measurement), and a signal-to-interference-plus-noise measurement (e.g., a signal-to-interference-plus-noise-ratio, SINR, measurement). Alternatively or additionally, the measurements 36 may include measurements on multiple different types of signals 32. For example, the measurements 36 may include one or more measurements on an SSB and one or more measurements on a CSI-RS.

For each of the measurements 36 that the wireless device performs, the wireless device 14 (e.g., via measurement handler 34) monitors for whether a so-called event is triggered for that measurement. An event may for example be triggered for a measurement when the measurement becomes better or worse than an absolute threshold. Such an event may for instance be an Event A1 (where a measurement of a signal from the serving cell becomes better than a threshold), an Event A2 (where a measurement of a signal from the serving cell becomes worse than a threshold), or an Event A4 (where a measurement of a signal from a neighbor cell becomes better than a threshold). As another example, an event may be triggered for a measurement when a measurement on one cell becomes an amount of an offset better than the same measurement on another cell. Such an event may for instance be an Event A3 (where a measurement on a neighbor cell becomes an amount of an offset better than the same measurement on the serving cell) or an Event A6 (where a measurement on a neighbor cell becomes an amount of an offset better than the same measurement on the Secondary Cell in Carrier Aggregation scenarios). As yet another example, an event may be triggered for a measurement when a measurement on one cell becomes worse than an absolute threshold and the same measurement on another cell becomes better than another absolute threshold. Such an event may for instance be an Event A5, where a measurement on the serving cell becomes worse than a first threshold and the same measurement on a neighbor cell becomes better than a second threshold.

In this context, the multiple conditions 30 related to timer 28 may be fulfilled in some embodiments when one or more events have been triggered for measurements 36 of multiple different types (e.g., RSRP and RSRQ) and/or for measurements 36 of multiple different types of signals (e.g., SSB and CSI-RS). For example, the multiple conditions 30 may be fulfilled when the same Event A1 has been triggered for measurements of multiple different types, e.g., for both RSRP and RSRQ. Or, as another example, the multiple conditions 30 may be fulfilled when an Event A6 has been triggered for a measurement of one type (e.g., RSRP) and an Event A2 has been triggered for a measurement of another type (e.g., RSRQ). As yet another example, the multiple conditions 30 may be fulfilled when the same Event A3 has been triggered for measurements on multiple different types of signals (e.g., SSB and CSI-RS).

In some embodiments, the measurement handler 34 monitors for triggering of the event(s) for measurements 36 and correspondingly notifies the timer controller 20 when one or more of the conditions 30 have been fulfilled, i.e., when one or more event(s) for measurements 36 have been fulfilled. In one embodiment, upon the timer controller 20 being notified of fulfillment of one of the multiple conditions 30, the timer controller 20 starts the timer 28 if the others of the multiple conditions 30 have already been fulfilled and if physical layer problems for the serving cell have already been detected (e.g., timer 22 is already running). Alternatively or additionally, upon physical layer problems for the serving cell being detected (e.g., upon the starting of timer 22), the timer controller 20 starts the timer 28 if all of the multiple conditions 30 have already been fulfilled. In some embodiments, the timer controller 20 is configured to stop the timer 28 upon physical layer problems for the serving cell having been resolved, upon triggering a handover procedure, upon initiating a connection re-establishment procedure, or upon a expiry of timer 22.

The duration of the timer 28 may represent the amount of time before the wireless device 14 declares radio link failure (RLF) towards the serving cell and initiates a connection re-establishment procedure (e.g., an RRC connection re-establishment procedure) or transitions to an idle state (e.g., an RRC idle state). In these and other embodiments, then, the wireless device 14 (e.g., via timer expiry handler 26) may initiate the connection re-establishment procedure, or transition to the idle state, at expiry of the timer 28. Notably, the duration of the timer 28 (e.g., T312 timer) may be configured such that the timer 28 expires before timer 22 (e.g., T310 timer) would have expired, meaning that expiry of timer 28 accelerates RLF declaration, connection re-establishment, and/or idle state transitioning as compared to timer 22. This may advantageously reduce unnecessary service interruption and/or latency.

Figure 2:
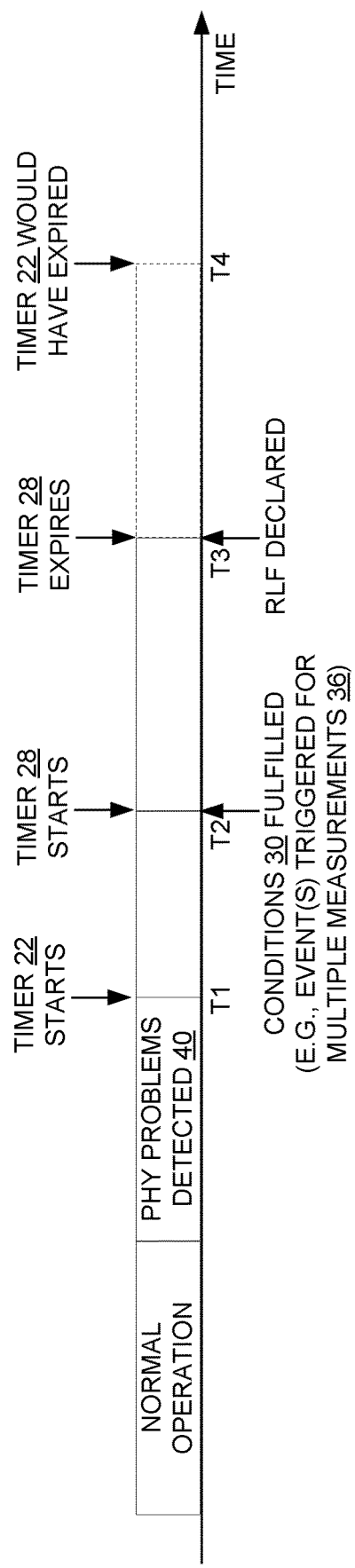
FIG. 2 is a timeline of operation of a wireless device according to some embodiments.

FIG. 2 shows one example. As shown, the wireless device 14 starts timer 22 at time T1 upon physical layer problems being detected (Block 40). Later at time T2, while timer 22 is still running (meaning that physical layer problems have not resolved), the multiple conditions 30 are fulfilled, e.g., the event(s) are triggered for measurements 36 of multiple different types and/or for measurements 36 on multiple different types of signals. This triggers the wireless device 14 to start timer 28. In this example, the timer 28 continues to run until it expires at time T3. This occurs even before time T4, when timer 22 would have expired if it had continued to run and would have prompted the wireless device 14 to declare RLF. Expiration of the timer 28 at time T3 therefore means that the wireless device 14 declares RLF earlier, at time T3, than if the wireless device 14 had waited until time T3 to declare RLF only upon expiration of timer 22.

Note that in some embodiments the one or more events whose triggering comprises fulfillment of the multiple conditions 30 may be referred to as one or more measurement reporting events. In one embodiment, the triggering of a measurement reporting event for a measurement may trigger the wireless device 14 to report the measurement to the serving radio network node 12-1. In fact, in embodiments where each measurement reporting event independently triggers a measurement report, the wireless device 14 may start the timer 28 when physical layer problems for the serving cell have been detected and multiple measurement reports have been triggered, e.g., by the triggering of the one or more events for measurements 36. In other embodiments, though, the one or more events whose triggering comprises fulfillment of the multiple conditions 30 may not necessarily trigger a measurement report, e.g., the timer 28 may be started without regard to or independently from measurement reporting.

Figure 3A:
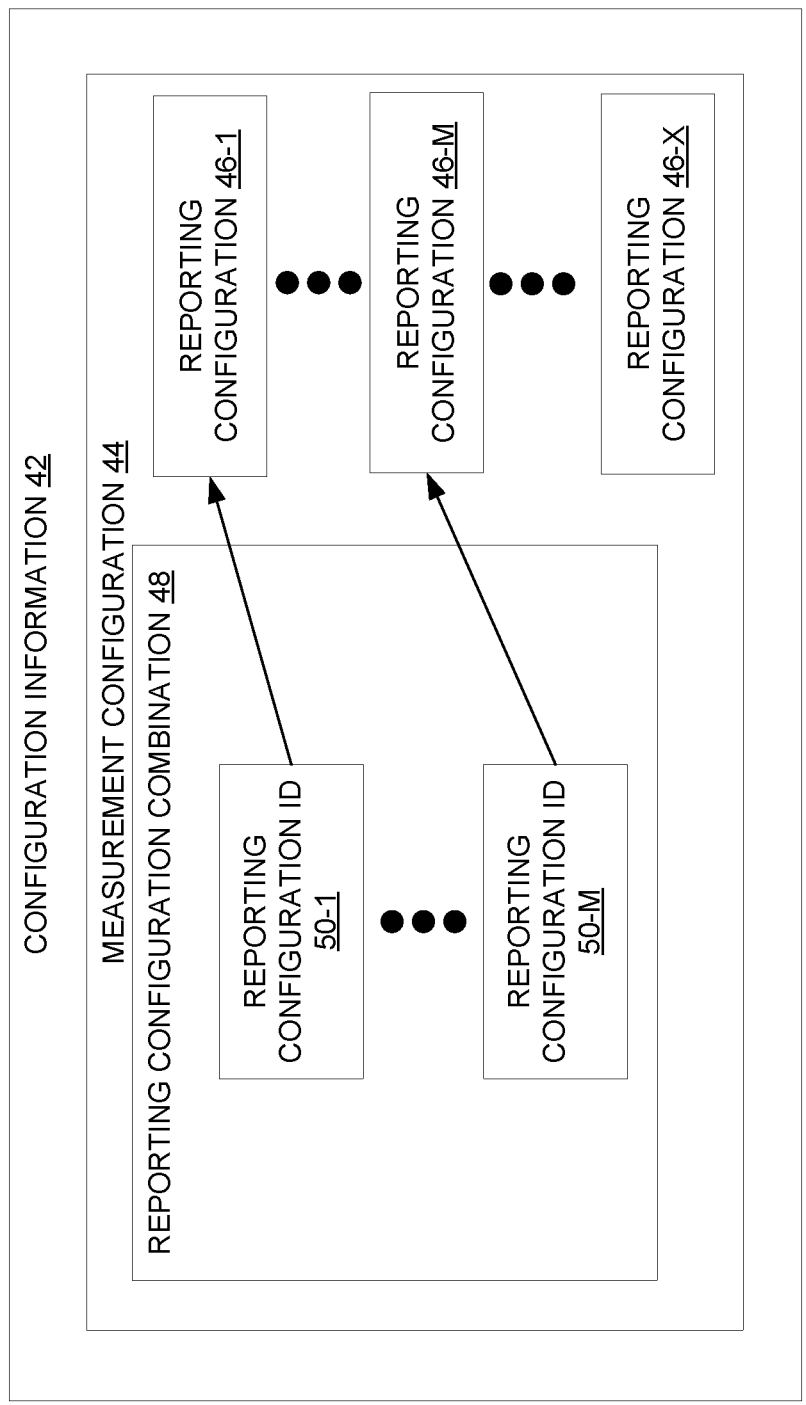
FIG. 3A is a block diagram of configuration information for configuring a timer of a wireless device according to some embodiments.
Figure 3B:
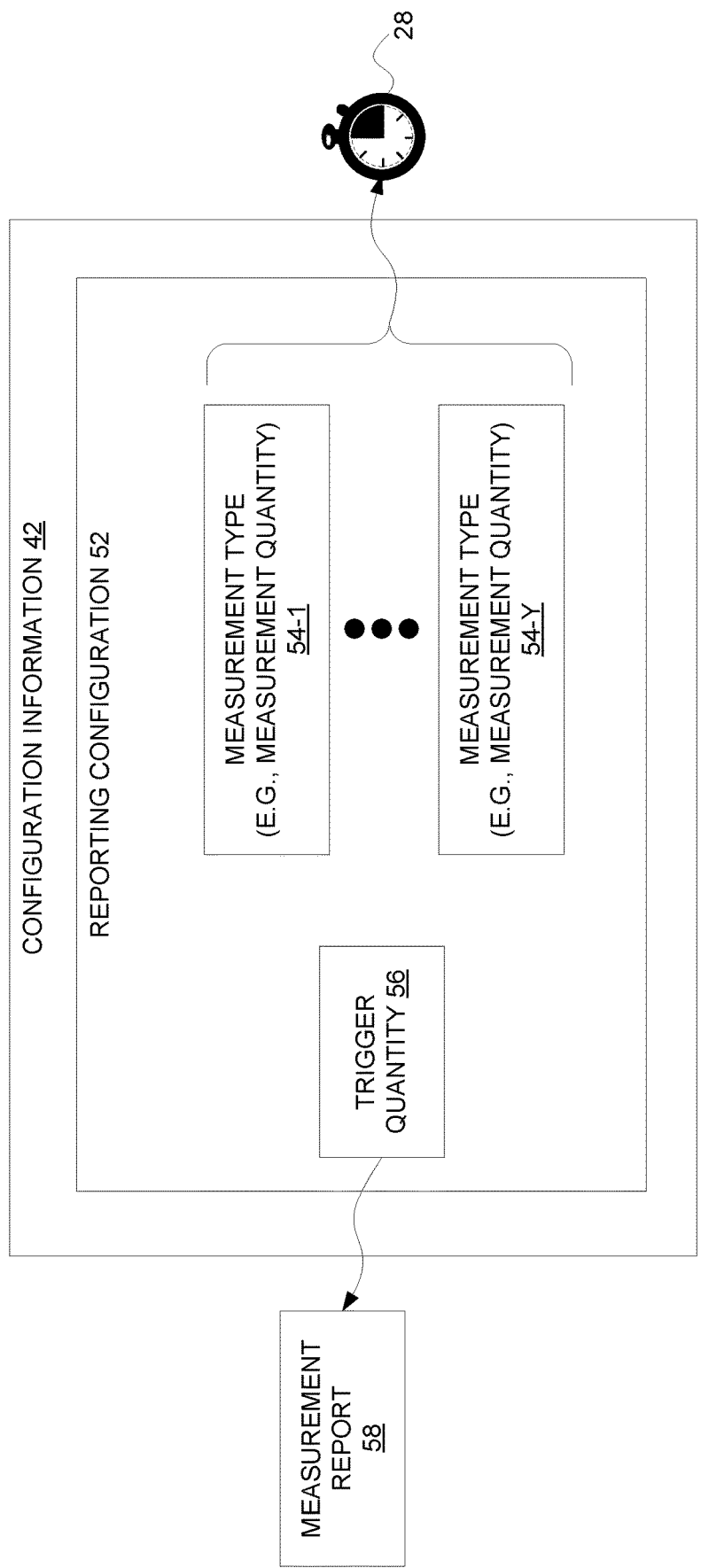
FIG. 3B is a block diagram of configuration information for configuring a timer of a wireless device according to other embodiments.

Note also that, in some embodiments as shown in FIG. 1, the wireless device 14 receives configuration information 42 (e.g., from serving radio network node 12-1) that configures the timer 28 as described above, i.e., to start when each of the multiple conditions 30 have been fulfilled and physical layer problems for the serving cell have been detected. The configuration information 42 may configure the timer 28 in this way via one or more so-called reporting configurations. FIGS. 3A-3B illustrate various embodiments in this regard.

FIG. 3A illustrates an embodiment for the configuration information 42 where the one or more events whose triggering comprises fulfillment of the multiple conditions are one or more measurement reporting events that trigger the wireless device 14 to send multiple measurement reports. As shown in this example, the configuration information 42 includes a measurement configuration 44. The measurement configuration 44 may include multiple reporting configurations 46-1 . . . 46-X. Each reporting configuration may for instance consist of: (i) a reporting criterion (e.g., event) that triggers the wireless device 14 to send a measurement report, on a periodic or one-time basis; (ii) a type of reference signal that the wireless device 14 is to use for beam and cell measurement results; and/or (iii) a reporting format that indicates the quantities per cell and per beam that the wireless device 14 is to include in a measurement report. Regardless, the measurement configuration 44 also indicates a combination 48 of the reporting configurations for which the timer 28 is applicable. The measurement configuration 44 may for instance indicate the combination 48 as a list of reporting configuration identifiers (IDs), e.g., a list of reporting configuration identifiers 50-1 . . . 50-M to indicate a combination of M reporting configurations 46-1 . . . 46-M out of the X reporting configurations included in the measurement configuration 44. In any event, the reporting configurations in the combination 48 configure triggering of respective ones of the multiple measurement reports (associated with fulfillment of the multiple conditions 30). In some embodiments, for instance, the measurement configuration 44 indicates the multiple conditions 30 whose fulfillment triggers the start of the timer 28 by indicating a combination 48 of reporting configurations 46-1 . . . 46-M, with different reporting configurations in the combination being associated with measurements of different types and/or measurements on different types of signals. In other words, the reporting configurations in the combination 48 specify criteria for triggering the one or more events for measurements of multiple different types and/or for measurements on multiple different types of signals.

FIG. 3B illustrates other embodiments where the configuration information 42 includes a reporting configuration 52 that itself indicates the multiple conditions 30 to be fulfilled to start the timer 28. That is, in FIG. 3B, a single reporting configuration 52 indicates the multiple conditions 30 referred to in FIG. 1, rather than a combination of multiple reporting configurations indicating the multiple conditions 30 as was the case in FIG. 3A. In the example shown, the reporting configuration 52 in this regard includes a list of measurement types 54-1 . . . 54-Y (e.g., in the form of measurement quantities such as RSRP, RSRQ, etc.) corresponding to respective ones of the multiple conditions 30. In some embodiments, this list of measurement types 54-1 . . . 54-Y may be specifically for triggering the start of the timer 28, without regard to triggering the sending of a measurement report. The wireless device 14 in this case may determine whether to trigger a measurement report 58 based on a trigger quantity 56 included in the reporting configuration 52, but determine whether or not to start the timer 28 based on the list of quantities or measurement types 54-1 . . . 54-Y included in the reporting configuration 52.

Figure 4:
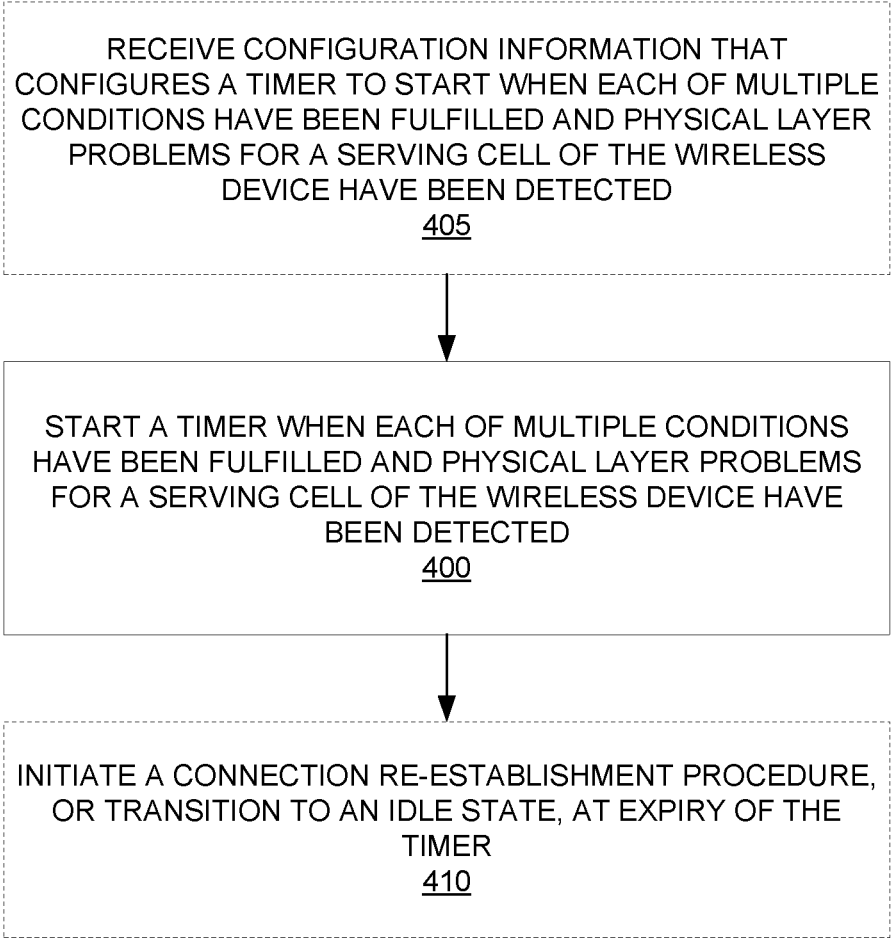
FIG. 4 is a logic flow diagram of a method performed by a wireless device according to some embodiments.

In view of the above modifications and variations, FIG. 4 depicts a method performed by a wireless device 14 configured for use in a wireless communication system 10 (e.g., a 5G system or an NR system) in accordance with particular embodiments. The method includes starting a timer 28 (e.g., a T312 timer) when each of multiple conditions 30 have been fulfilled and physical layer problems for a serving cell of the wireless device 14 have been detected (block 400). The method in some embodiments may also include initiating a connection re-establishment procedure, or transitioning to an idle state, at expiry of the timer 28 (block 410).

In some embodiments, the multiple conditions 30 have been fulfilled when one or more events have been triggered for measurements 36 of multiple different types and/or for measurements 36 on multiple different types of signals 32. The different types of measurements may for example include two or more of: a signal power measurement, a signal quality measurement, and a signal-to-interference-plus-noise measurement. Alternatively or additionally, the different types of signals may for example include two or more of: a channel state information reference signal (CSI-RS), a cell-specific reference signal (CRS), a synchronization signal (SS), and a synchronization signal block (SSB).

In some embodiments, the one or more events include one or more of: (i) an event in which a measurement becomes better or worse than an absolute threshold; (ii) an event in which a measurement on one cell becomes an amount of an offset better than the same measurement on another cell; and (iii) an event in which a measurement on one cell becomes worse than an absolute threshold and the same measurement on another cell becomes better than another absolute threshold.

In some embodiment, the one or more events comprise one or more measurement reporting events.

In some embodiments, the method further includes receiving configuration information 42 that configures the timer 28 to start when each of the multiple conditions 30 have been fulfilled and physical layer problems for the serving cell have been detected (block 405). In some embodiments, for example, the configuration information includes a measurement configuration. The measurement configuration may indicate a combination of reporting configurations for which the timer 28 is applicable, e.g., as a list of reporting configuration identifiers. In one such embodiment, the multiple conditions 30 include triggering of multiple measurement reports, and the reporting configurations in the combination configure triggering of respective ones of the multiple measurement reports. In other embodiments, the configuration information includes a reporting configuration, where the reporting configuration indicates the multiple conditions 30 to be fulfilled. In this case, the configuration information may include a reporting configuration, where the reporting configuration includes a list of quantities or measurement types corresponding to respective ones of the multiple conditions 30. The method in one embodiment may further include determining whether to trigger a measurement report based on a trigger quantity included in the reporting configuration, and determining whether or not to start the timer 28 based on the list of quantities or measurement types included in the reporting configuration.

In some embodiments (not shown), the method may further comprise stopping the timer 28 upon physical layer problems for the serving cell having been resolved, upon triggering a handover procedure, upon initiating a connection re-establishment procedure, or upon a expiry of a timer started when physical layer problems for the serving cell have been detected.

In any of the above embodiments, the multiple conditions 30 may include triggering of multiple measurement reports, such that the timer 28 is started when multiple measurement reports have been triggered and physical layer problems for the serving cell have been detected. In some embodiments, the multiple measurement reports report different types of measurements. The different types of measurements may for example include two or more of: a signal power measurement, a signal quality measurement, and a signal-to-interference-plus-noise measurement. Alternatively or additionally, the multiple measurement reports may report measurements of different types of signals. The different types of signals may for example include two or more of: a channel state information reference signal (CSI-RS), a cell-specific reference signal (CRS), a synchronization signal (SS), and a synchronization signal block (SSB).

In some embodiments, the method may further include transmitting a measurement report that indicates a status of the timer 28.

In some embodiments, an out-of-sync timer 22 at the wireless device is to be started when physical layer problems for the serving cell have been detected. In this case, the method may further comprise transmitting a measurement report that indicates a status of the out-of-sync timer 22.

In some embodiments, the method may comprise starting the timer 28 upon one of the multiple conditions 30 being fulfilled and each of the others of the multiple conditions 30 having already been fulfilled and physical layer problems for the serving cell already having been detected. Alternatively or additionally, the method may comprise starting the timer 28 upon physical layer problems for the serving cell being detected and each of the multiple conditions 30 having already been fulfilled.

In some embodiments, an out-of-sync timer 22 (e.g., a T310 timer) at the wireless device is to be started when physical layer problems for the serving cell have been detected. In this case, starting a timer 28 when each of multiple conditions 30 have been fulfilled and physical layer problems for a serving cell of the wireless device have been detected may comprise starting a timer 28 when each of multiple conditions 30 have been fulfilled and the out-of-sync timer 22 is running.

Figure 5:
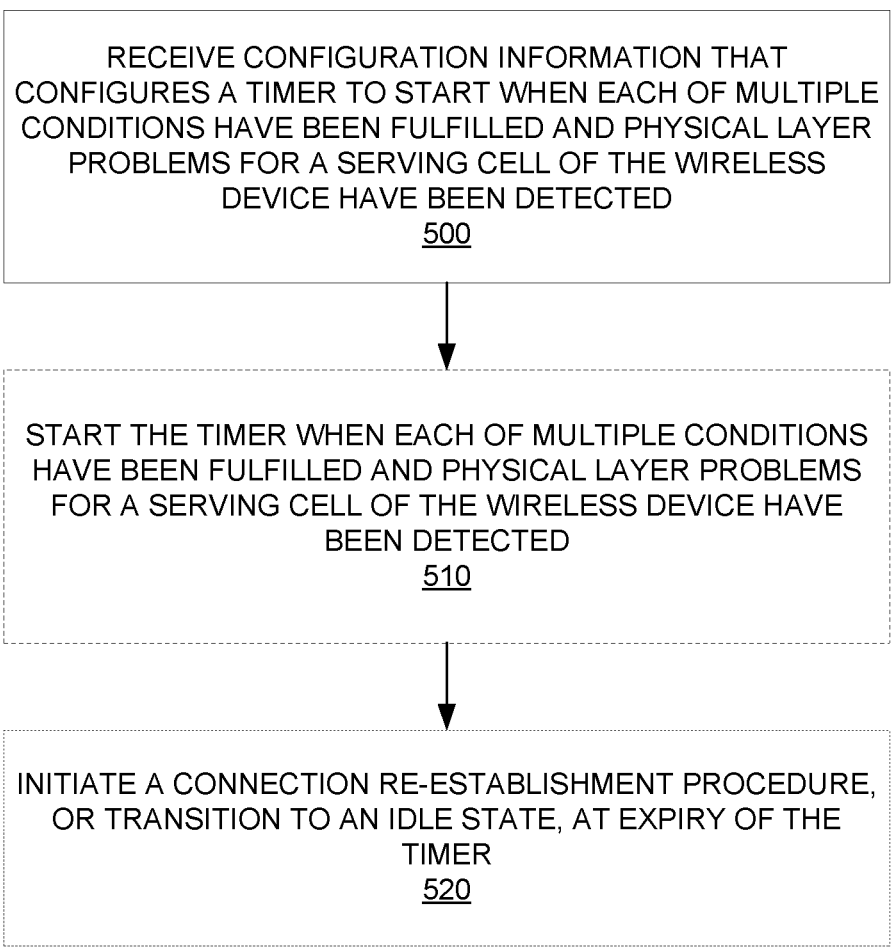
FIG. 5 is a logic flow diagram of a method performed by a wireless device according to other embodiments.

FIG. 5 depicts a method performed by a wireless device configured for use in a wireless communication system (e.g., a 5G system or an NR system) in accordance with other particular embodiments. The method includes receiving configuration information that configures a timer 28 (e.g., a T312 timer) to start when each of multiple conditions 30 have been fulfilled and physical layer problems for a serving cell of the wireless device have been detected (block 500).

In some embodiments, the multiple conditions 30 have been fulfilled when one or more events have been triggered for measurements 36 of multiple different types and/or for measurements 36 on multiple different types of signals 32. The different types of measurements may for example include two or more of: a signal power measurement, a signal quality measurement, and a signal-to-interference-plus-noise measurement. Alternatively or additionally, the different types of signals may for example include two or more of: a channel state information reference signal (CSI-RS), a cell-specific reference signal (CRS), a synchronization signal (SS), and a synchronization signal block (SSB).

In some embodiments, the one or more events include one or more of: (i) an event in which a measurement becomes better or worse than an absolute threshold; (ii) an event in which a measurement on one cell becomes an amount of an offset better than the same measurement on another cell; and (iii) an event in which a measurement on one cell becomes worse than an absolute threshold and the same measurement on another cell becomes better than another absolute threshold.

In some embodiment, the one or more events comprise one or more measurement reporting events.

In some embodiments, for example, the configuration information includes a measurement configuration. The measurement configuration may indicate a combination of reporting configurations for which the timer 28 is applicable, e.g., as a list of reporting configuration identifiers. In one such embodiment, the multiple conditions 30 include triggering of multiple measurement reports, and the reporting configurations in the combination configure triggering of respective ones of the multiple measurement reports. In other embodiments, the configuration information includes a reporting configuration, where the reporting configuration indicates the multiple conditions 30 to be fulfilled. In this case, the configuration information may include a reporting configuration, where the reporting configuration includes a list of quantities or measurement types corresponding to respective ones of the multiple conditions 30. The method in one embodiment may further include determining whether to trigger a measurement report based on a trigger quantity included in the reporting configuration, and determining whether or not to start the timer 28 based on the list of quantities or measurement types included in the reporting configuration.

In any of the above embodiments, the multiple conditions 30 may include triggering of multiple measurement reports, such that the timer 28 is started when multiple measurement reports have been triggered and physical layer problems for the serving cell have been detected. In some embodiments, the multiple measurement reports report different types of measurements. The different types of measurements may for example include two or more of: a signal power measurement, a signal quality measurement, and a signal-to-interference-plus-noise measurement. Alternatively or additionally, the multiple measurement reports may report measurements of different types of signals. The different types of signals may for example include two or more of: a channel state information reference signal (CSI-RS), a cell-specific reference signal (CRS), a synchronization signal (SS), and a synchronization signal block (SSB).

In some embodiments, the method further includes starting the timer 28 when each of multiple conditions 30 have been fulfilled and physical layer problems for a serving cell of the wireless device have been detected (block 510). Alternatively or additionally, the method may include initiating a connection re-establishment procedure, or transitioning to an idle state, at expiry of the timer 28 (block 520).

In some embodiments (not shown), the method may further comprise stopping the timer 28 upon physical layer problems for the serving cell having been resolved, upon triggering a handover procedure, upon initiating a connection re-establishment procedure, or upon a expiry of a timer started when physical layer problems for the serving cell have been detected.

In some embodiments, the method may further include transmitting a measurement report that indicates a status of the timer 28.

In some embodiments, an out-of-sync timer 22 at the wireless device is to be started when physical layer problems for the serving cell have been detected. In this case, the method may further comprise transmitting a measurement report that indicates a status of the out-of-sync timer 22.

In some embodiments, the method may comprise starting the timer 28 upon one of the multiple conditions 30 being fulfilled and each of the others of the multiple conditions 30 having already been fulfilled and physical layer problems for the serving cell already having been detected. Alternatively or additionally, the method may comprise starting the timer 28 upon physical layer problems for the serving cell being detected and each of the multiple conditions 30 having already been fulfilled.

In some embodiments, an out-of-sync timer 22 (e.g., a T310 timer) at the wireless device is to be started when physical layer problems for the serving cell have been detected. In this case, starting a timer 28 when each of multiple conditions 30 have been fulfilled and physical layer problems for a serving cell of the wireless device have been detected may comprise starting a timer 28 when each of multiple conditions 30 have been fulfilled and the out-of-sync timer 22 is running.

Figure 6:
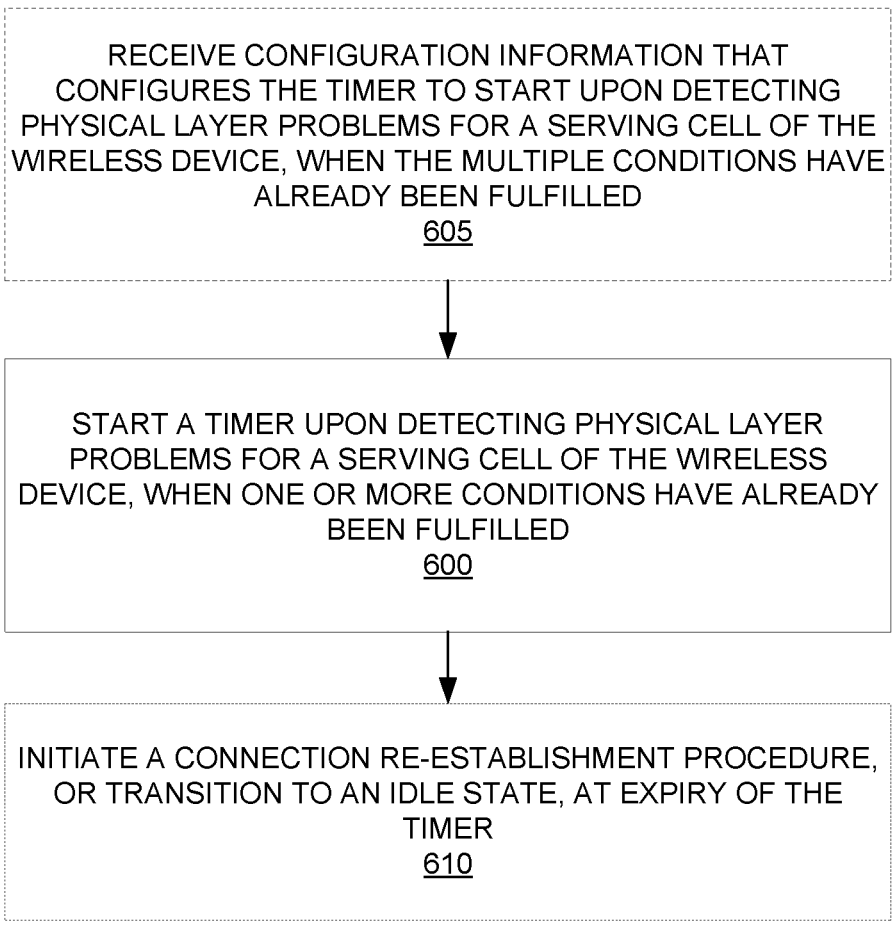
FIG. 6 is a logic flow diagram of a method performed by a wireless device according to yet other embodiments.

FIG. 6 depicts a method performed by a wireless device configured for use in a wireless communication system (e.g., a 5G system or an NR system) in accordance with particular embodiments. The method includes starting a timer 28 (e.g., a T312 timer) upon detecting physical layer problems for a serving cell of the wireless device, when one or more conditions 30 have already been fulfilled (block 600).

In some embodiments (not shown), the method may further comprise stopping the timer 28 upon physical layer problems for the serving cell having been resolved, upon triggering a handover procedure, upon initiating a connection re-establishment procedure, or upon a expiry of a timer 22 started when physical layer problems for the serving cell have been detected.

In some embodiments, the one or more conditions 30 include triggering of one or more measurement reports, such that the timer 28 is started upon detecting physical layer problems for a serving cell of the wireless device, when the one or more measurement reports have already been triggered. In one such embodiment, the one or more measurement reports comprise multiple measurement reports, where the multiple measurement reports report different types of measurements. The different types of measurements may for example include two or more of: a signal power measurement, a signal quality measurement, and a signal-to-interference-plus-noise measurement. Alternatively or additionally, the one or more measurement reports comprise multiple measurement reports, where the multiple measurement reports report measurements of different types of signals. The different types of signals may for example include two or more of: a channel state information reference signal (CSI-RS), a cell-specific reference signal (CRS), a synchronization signal (SS), and a synchronization signal block (SSB).

In any of the above embodiments, the one or more conditions 30 may include multiple conditions 30. In this case, the method may further comprise receiving configuration information that configures the timer 28 to start upon detecting physical layer problems for a serving cell of the wireless device, when the multiple conditions 30 have already been fulfilled (block 605). In one embodiment, the configuration information includes a measurement configuration. The measurement configuration indicates a combination of reporting configurations for which the timer 28 is applicable, e.g., as a list of reporting configuration identifiers. In this case, the multiple conditions 30 may include triggering of multiple measurement reports, and the reporting configurations in the combination configure triggering of respective ones of the multiple measurement reports. In other embodiments, the configuration information includes a reporting configuration, where the reporting configuration indicates the multiple conditions 30 to be fulfilled. In this case, the configuration information may include a reporting configuration, where the reporting configuration includes a list of quantities or measurement types corresponding to respective ones of the multiple conditions 30. The method in one embodiment may further include determining whether to trigger a measurement report based on a trigger quantity included in the reporting configuration, and determining whether or not to start the timer 28 based on the list of quantities or measurement types included in the reporting configuration.

In some embodiments, the method may further include transmitting a measurement report that indicates a status of the timer 28.

In some embodiments, an out-of-sync timer 22 (e.g., T310) at the wireless device is to be started when physical layer problems for the serving cell have been detected. In this case, the method may further comprise transmitting a measurement report that indicates a status of the out-of-sync timer 22.

In some embodiments, an out-of-sync timer 22 (e.g., T310) at the wireless device is to be started when physical layer problems for the serving cell have been detected. In this case, starting the timer 28 upon detecting physical layer problems for a serving cell of the wireless device, when one or more conditions 30 have already been fulfilled may comprise starting the timer 28 upon starting the out-of-sync timer 22, when one or more conditions 30 have already been fulfilled.

Alternatively or additionally, the method may include initiating a connection re-establishment procedure, or transitioning to an idle state, at expiry of the timer 28 (block 610).

Figure 7:
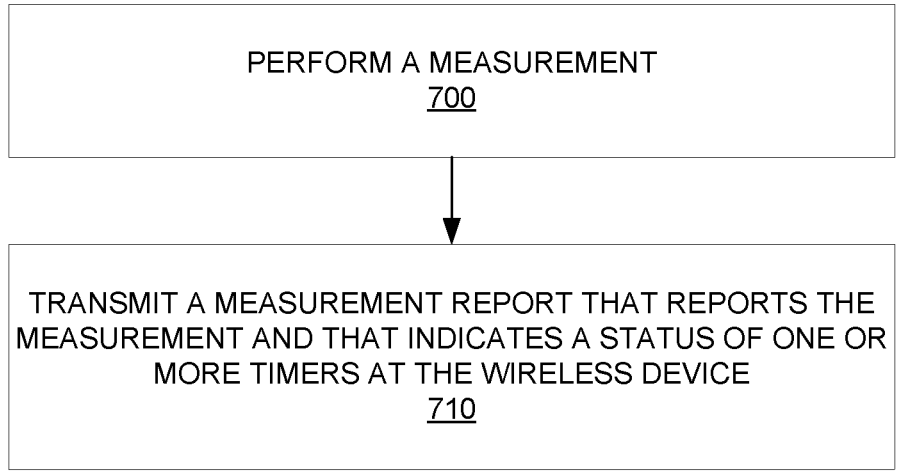
FIG. 7 is a logic flow diagram of a method performed by a wireless device according to still other embodiments.

FIG. 7 depicts another method performed by a wireless device configured for use in a wireless communication system (e.g., a 5G system or an NR system) in accordance with particular embodiments. The method includes performing a measurement (block 700) and transmitting a measurement report that reports the measurement and that indicates a status of one or more timers at the wireless device (block 710). The one or more timers may for instance include a T310 timer and/or a T312 timer.

In some embodiments, the one or more timers include a first timer 28 (e.g., a T312 timer) that is configured to be started when each of one or more conditions 30 have been fulfilled at the wireless device and physical layer problems for a serving cell of the wireless device have been detected by the wireless device. In this case, the method may further comprise initiating a connection re-establishment procedure, or transitioning to an idle state, at expiry of the first timer 28. Alternatively or additionally, the method may further comprise stopping the first timer 28 upon physical layer problems for the serving cell having been resolved, upon triggering a handover procedure, upon initiating a connection re-establishment procedure, or upon a expiry of a timer 22 started when physical layer problems for the serving cell have been detected.

Regardless, the one or more conditions 30 may include triggering of one or more measurement reports, such that the first timer 28 is configured to be started when one or more measurement reports have been triggered and physical layer problems for the serving cell have been detected. For example, the one or more measurement reports may comprise multiple measurement reports, where the multiple measurement reports report different types of measurements. The different types of measurements may include two or more of: a signal power measurement, a signal quality measurement, and a signal-to-interference-plus-noise measurement. Alternatively or additionally, the one or more measurement reports may comprise multiple measurement reports, wherein the multiple measurement reports report measurements of different types of signals. The different types of signals may include two or more of: a channel state information reference signal (CSI-RS), a cell-specific reference signal (CRS), a synchronization signal (SS), and a synchronization signal block (SSB).

In some embodiments, the one or more conditions 30 include multiple conditions 30. In this case, the method may further comprise receiving configuration information that configures the first timer 28 to start upon detecting physical layer problems for a serving cell of the wireless device, when the multiple conditions 30 have already been fulfilled. In one such embodiment, the configuration information includes a measurement configuration, where the measurement configuration indicates a combination of reporting configurations for which the first timer 28 is applicable. In this case, the multiple conditions 30 may include triggering of multiple measurement reports, and the reporting configurations in the combination may configure triggering of respective ones of the multiple measurement reports. In either case, the measurement configuration may indicate the combination of reporting configurations as a list of reporting configuration identifiers. In other embodiments, the configuration information includes a reporting configuration, where the reporting configuration indicates the multiple conditions 30 to be fulfilled. In one such embodiment, the configuration information includes a reporting configuration, where the reporting configuration includes a list of quantities or measurement types corresponding to respective ones of the multiple conditions 30. The method in this case may further comprise determining whether to trigger a measurement report based on a trigger quantity included in the reporting configuration, and determining whether or not to start the first timer 28 based on the list of quantities or measurement types included in the reporting configuration.

In some embodiments, an out-of-sync timer 22 (e.g., a T310 timer) at the wireless device is to be started when physical layer problems for the serving cell have been detected, where the one or more timers include the out-of-sync timer 22.

Figure 8:
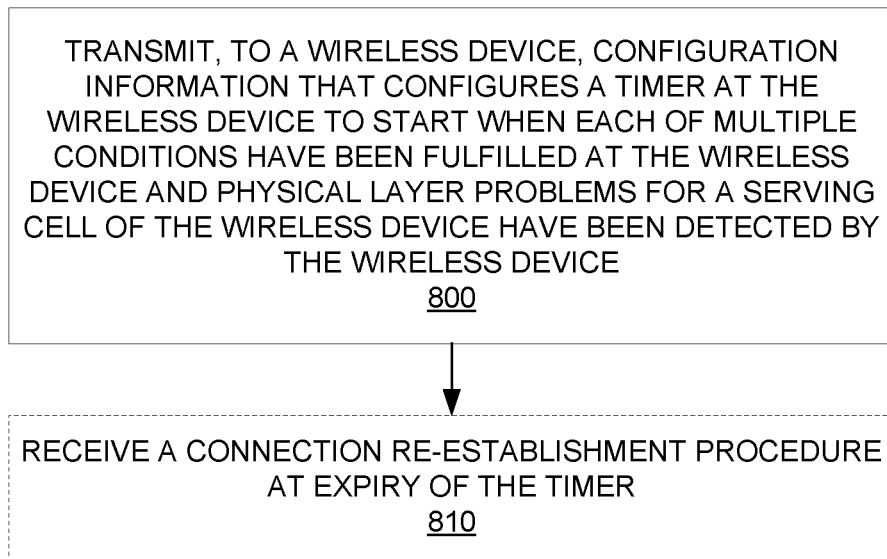
FIG. 8 is a logic flow diagram of a method performed by a network node according to some embodiments.

FIG. 8 depicts a method performed by a network node in accordance with particular embodiments. The method includes transmitting, to a wireless device, configuration information that configures a timer 28 (e.g., a T312 timer) at the wireless device to start when each of multiple conditions 30 have been fulfilled at the wireless device and physical layer problems for a serving cell of the wireless device have been detected by the wireless device (block 800). In some embodiments, the method also includes receiving a connection re-establishment procedure at expiry of the timer 28 (Block 810).

In some embodiments, the multiple conditions 30 have been fulfilled when one or more events have been triggered for measurements 36 of multiple different types and/or for measurements 36 on multiple different types of signals 32. The different types of measurements may for example include two or more of: a signal power measurement, a signal quality measurement, and a signal-to-interference-plus-noise measurement. Alternatively or additionally, the different types of signals may for example include two or more of: a channel state information reference signal (CSI-RS), a cell-specific reference signal (CRS), a synchronization signal (SS), and a synchronization signal block (SSB).

In some embodiments, the one or more events include one or more of: (i) an event in which a measurement becomes better or worse than an absolute threshold; (ii) an event in which a measurement on one cell becomes an amount of an offset better than the same measurement on another cell; and (iii) an event in which a measurement on one cell becomes worse than an absolute threshold and the same measurement on another cell becomes better than another absolute threshold.

In some embodiment, the one or more events comprise one or more measurement reporting events.

In any of the above embodiments, the multiple conditions 30 may include triggering of multiple measurement reports, such that the timer 28 is configured to be started when multiple measurement reports have been triggered and physical layer problems for the serving cell have been detected. In some embodiments, the multiple measurement reports report different types of measurements. The different types of measurements may for example include two or more of: a signal power measurement, a signal quality measurement, and a signal-to-interference-plus-noise measurement. Alternatively or additionally, the multiple measurement reports may report measurements of different types of signals. The different types of signals may for example include two or more of: a channel state information reference signal (CSI-RS), a cell-specific reference signal (CRS), a synchronization signal (SS), and a synchronization signal block (SSB).

In some embodiments, for example, the configuration information includes a measurement configuration. The measurement configuration may indicate a combination of reporting configurations for which the timer 28 is applicable, e.g., as a list of reporting configuration identifiers. In one such embodiment, the multiple conditions 30 include triggering of multiple measurement reports, and the reporting configurations in the combination configure triggering of respective ones of the multiple measurement reports. In other embodiments, the configuration information includes a reporting configuration, where the reporting configuration indicates the multiple conditions 30 to be fulfilled. In this case, the configuration information may include a reporting configuration, where the reporting configuration includes a list of quantities or measurement types corresponding to respective ones of the multiple conditions 30. In one embodiment, a trigger quantity included in the reporting configuration is for triggering a measurement report, and the list of quantities or measurement types included in the reporting configuration is for determining whether or not to start the timer 28.

In some embodiments, the method may further include receiving a measurement report that indicates a status of the timer 28. In one such embodiment, the method may further comprise, based on the measurement report indicating that the timer 28 is running at the wireless device, requesting a radio network node to transmit a certain type of handover command to the wireless device. Or, the method may further comprise, based on the measurement report indicating that the timer 28 is running at the wireless device, accelerating transmission of a downlink message to the wireless device that prevents the wireless device from declaring radio link failure.

In some embodiments, an out-of-sync timer 22 at the wireless device is to be started when physical layer problems for the serving cell have been detected. In this case, the method may further comprise receiving a measurement report that indicates a status of the out-of-sync timer 22.

In some embodiments, an out-of-sync timer 22 (e.g., a T310 timer) at the wireless device is to be started when physical layer problems for the serving cell have been detected. In this case, the configuration information configures the timer 28 to start when each of multiple conditions 30 have been fulfilled and physical layer problems for a serving cell of the wireless device have been detected by configuring the timer 28 to start when each of multiple conditions 30 have been fulfilled and the out-of-sync timer 22 is running.

Figure 9:
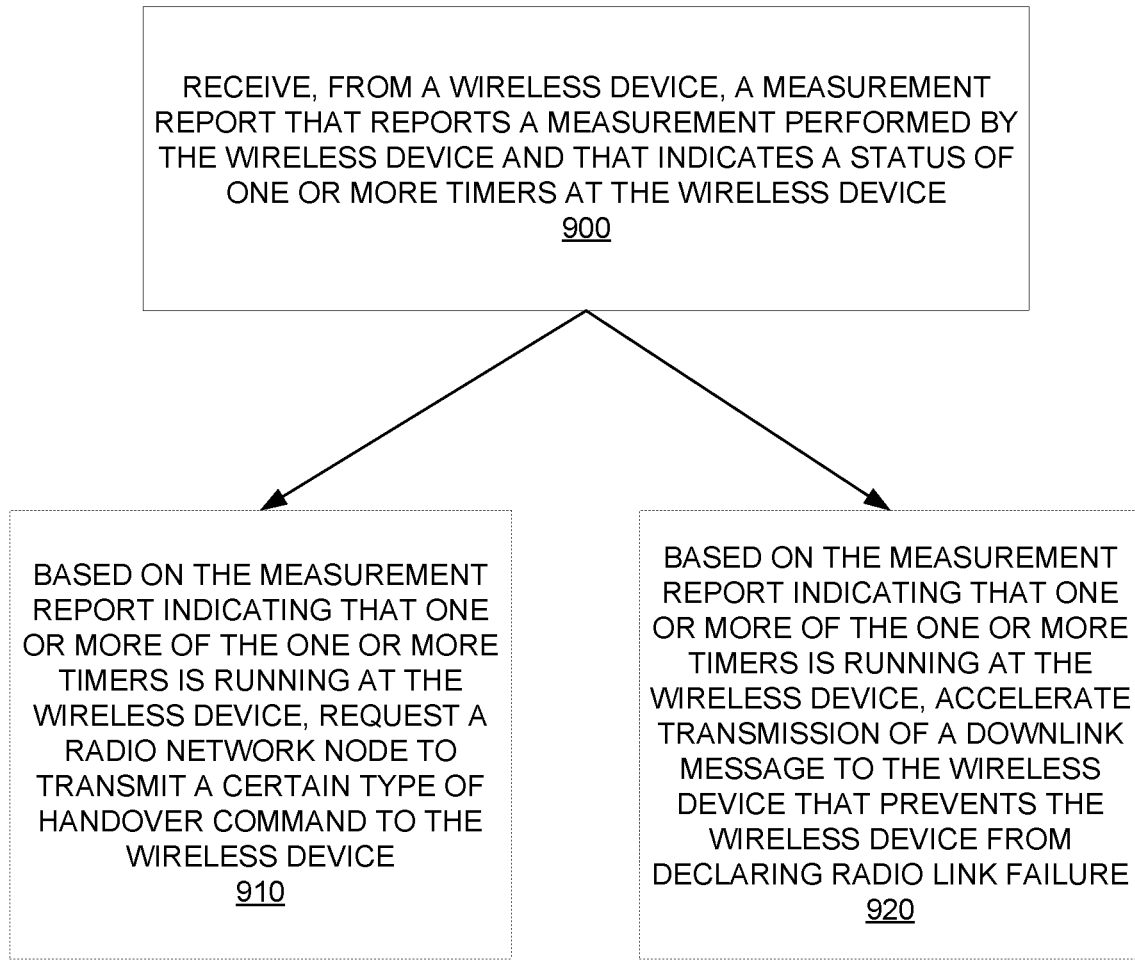
FIG. 9 is a logic flow diagram of a method performed by a network node according to other embodiments.

FIG. 9 depicts another method performed by a network node in accordance with other particular embodiments. The method includes receiving from a wireless device a measurement report that reports a measurement performed by the wireless device and that indicates a status of one or more timers at the wireless device (block 900). The one or more timers may for instance include a T310 timer and/or a T312 timer.

In some embodiments, the method may include, based on the measurement report indicating that one or more of the one or more timers is running at the wireless device, requesting a radio network node to transmit a certain type of handover command to the wireless device (block 910).

In other embodiments, the method may include, based on the measurement report indicating that one or more of the one or more timers is running at the wireless device, accelerating transmission of a downlink message to the wireless device that prevents the wireless device from declaring radio link failure (block 920).

In some embodiments, an out-of-sync timer 22 at the wireless device is to be started when physical layer problems for the serving cell have been detected. In this case, the one or more timers may include the out-of-sync timer 22.

In some embodiments, the one or more timers include a first timer 28 (e.g., a T312 timer) that is configured to be started when each of one or more conditions 30 have been fulfilled at the wireless device and physical layer problems for a serving cell of the wireless device have been detected by the wireless device. In one such embodiment, the one or more conditions 30 include triggering of one or more measurement reports, such that the first timer 28 is configured to be started when one or more measurement reports have been triggered and physical layer problems for the serving cell have been detected. For example, the one or more measurement reports may comprise multiple measurement reports, where the multiple measurement reports report different types of measurements. The different types of measurements may include two or more of: a signal power measurement, a signal quality measurement, and a signal-to-interference-plus-noise measurement. Alternatively or additionally, the one or more measurement reports may comprise multiple measurement reports, wherein the multiple measurement reports report measurements of different types of signals. The different types of signals may include two or more of: a channel state information reference signal (CSI-RS), a cell-specific reference signal (CRS), a synchronization signal (SS), and a synchronization signal block (SSB).

Embodiments herein also include corresponding apparatuses. Embodiments herein for instance include a wireless device 14 configured to perform any of the steps of any of the embodiments described above for the wireless device 14.

Embodiments also include a wireless device 14 comprising processing circuitry and power supply circuitry. The processing circuitry is configured to perform any of the steps of any of the embodiments described above for the wireless device 14. The power supply circuitry is configured to supply power to the wireless device 14.

Embodiments further include a wireless device 14 comprising processing circuitry. The processing circuitry is configured to perform any of the steps of any of the embodiments described above for the wireless device 14. In some embodiments, the wireless device 14 further comprises communication circuitry.

Embodiments further include a wireless device 14 comprising processing circuitry and memory. The memory contains instructions executable by the processing circuitry whereby the wireless device 14 is configured to perform any of the steps of any of the embodiments described above for the wireless device 14.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 12-1 configured to perform any of the steps of any of the embodiments described above for the radio network node 12-1.

Embodiments also include a radio network node 12-1 comprising processing circuitry and power supply circuitry. The processing circuitry is configured to perform any of the steps of any of the embodiments described above for the radio network node 12-1. The power supply circuitry is configured to supply power to the radio network node 12-1.

Embodiments further include a radio network node 12-1 comprising processing circuitry. The processing circuitry is configured to perform any of the steps of any of the embodiments described above for the radio network node 12-1. In some embodiments, the radio network node 12-1 further comprises communication circuitry.

Embodiments further include a radio network node 12-1 comprising processing circuitry and memory. The memory contains instructions executable by the processing circuitry whereby the radio network node 12-1 is configured to perform any of the steps of any of the embodiments described above for the radio network node 12-1.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 10:
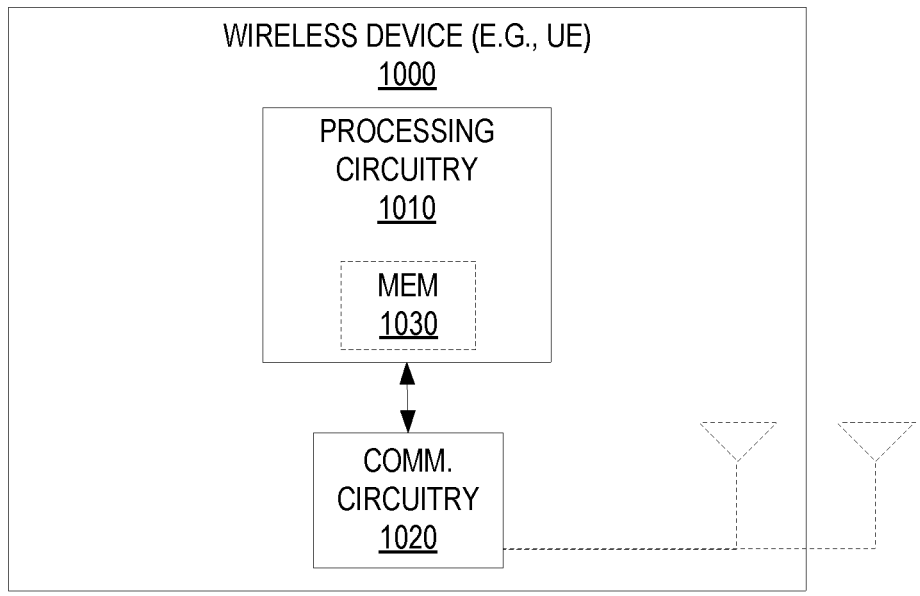
FIG. 10 is a block diagram of a wireless device according to some embodiments.

FIG. 10 for example illustrates a wireless device 1000 (e.g., wireless device 14) as implemented in accordance with one or more embodiments. As shown, the wireless device 1000 includes processing circuitry 1010 and communication circuitry 1020. The communication circuitry 1020 (e.g., radio circuitry) is configured to transmit and/or receive information to and/or from one or more other nodes, e.g., via any communication technology. Such communication may occur via one or more antennas that are either internal or external to the wireless device 1000. The processing circuitry 1010 is configured to perform processing described above, e.g., in any of FIGS. 4-7 such as by executing instructions stored in memory 1030. The processing circuitry 1010 in this regard may implement certain functional means, units, or modules.

Figure 11:
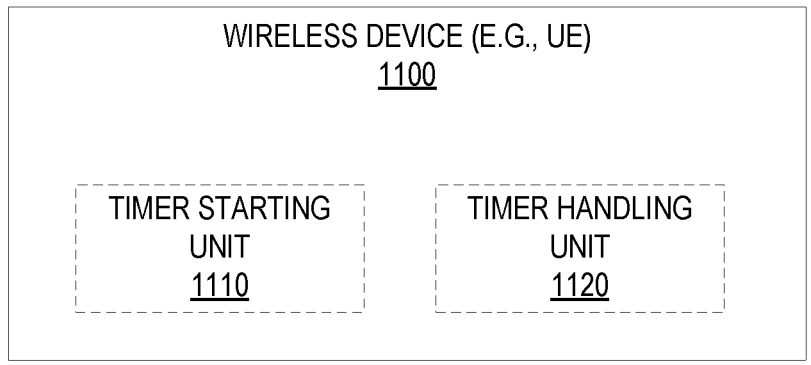
FIG. 11 is a block diagram of a wireless device according to other embodiments.
Figure 20:
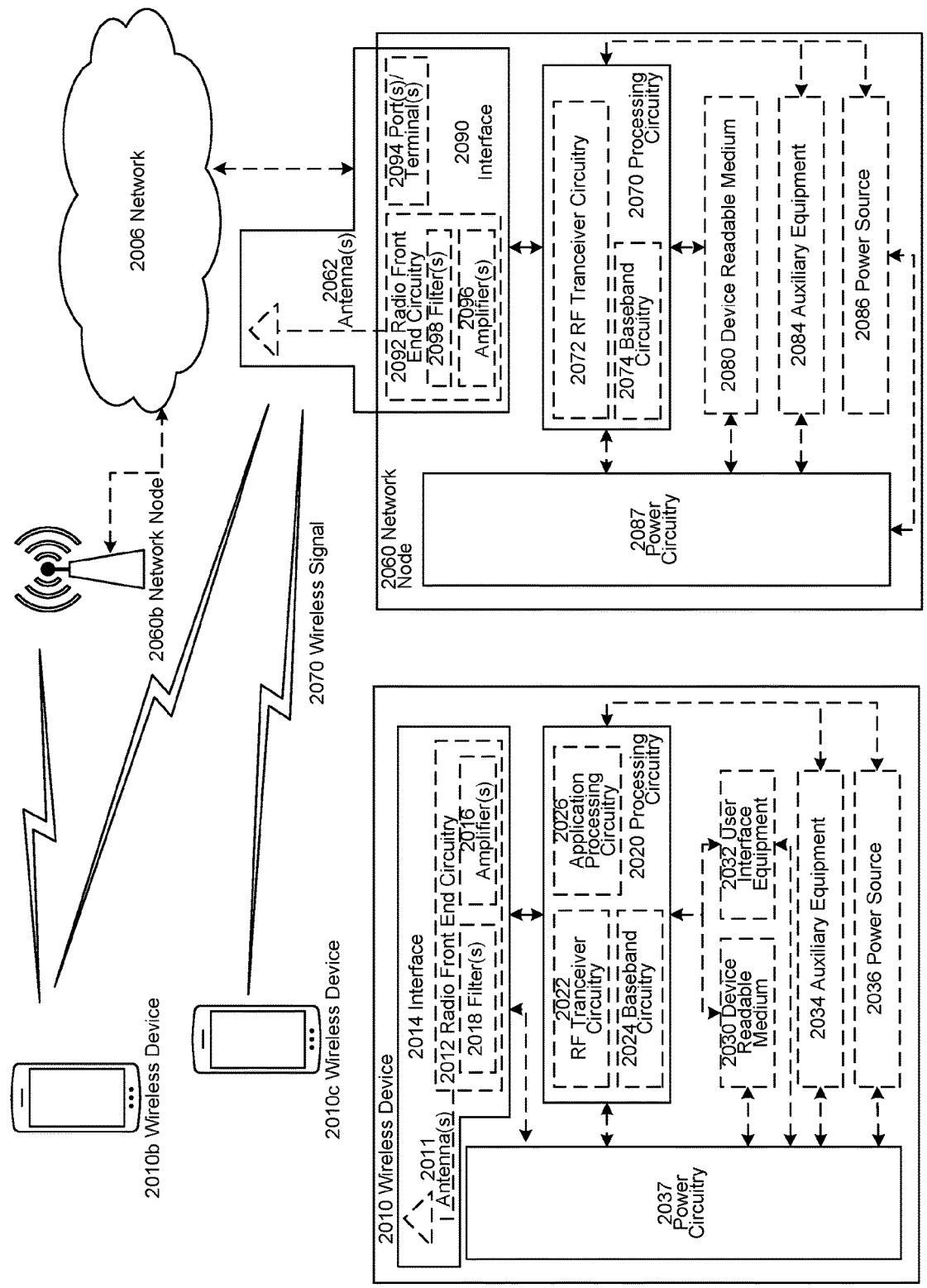
FIG. 20 is a block diagram of a wireless communication network according to some embodiments.

FIG. 11 illustrates a schematic block diagram of a wireless device 1100 (e.g., wireless device 14) in a wireless network according to still other embodiments (for example, the wireless network shown in FIG. 20). As shown, the wireless device 1100 implements various functional means, units, or modules, e.g., via the processing circuitry 1010 in FIG. 10 and/or via software code. These functional means, units, or modules, e.g., for implementing the method(s) herein, include, for instance, a timer starting unit 1110 configured to start a timer 28 when each of multiple conditions 30 have been fulfilled and physical layer problems for a serving cell of the wireless device have been detected. The functional implementation may also include a timer handling unit 1120 configured to initiate a connection re-establishment procedure, or transition to an idle state, at expiry of the timer 28.

Figure 12:
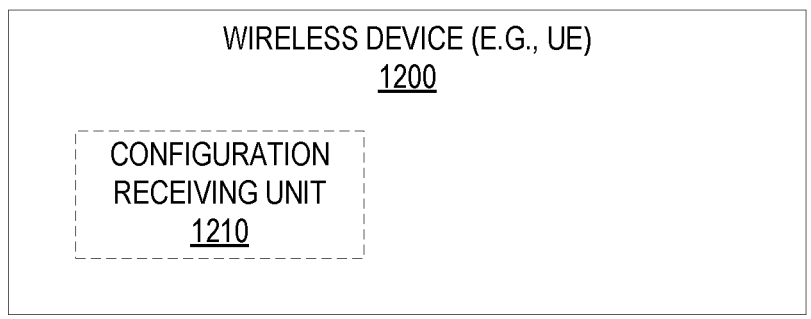
FIG. 12 is a block diagram of a wireless device according to still other embodiments.

FIG. 12 illustrates a schematic block diagram of a wireless device 1200 (e.g., wireless device 14) in a wireless network according to still other embodiments (for example, the wireless network shown in FIG. 20). As shown, the wireless device 1200 implements various functional means, units, or modules, e.g., via the processing circuitry 1010 in FIG. 10 and/or via software code. These functional means, units, or modules, e.g., for implementing the method(s) herein, include, for instance, a configuration receiving unit 1210 for receiving configuration information that configures a timer 28 to start when each of multiple conditions 30 have been fulfilled and physical layer problems for a serving cell of the wireless device have been detected.

Figure 13:
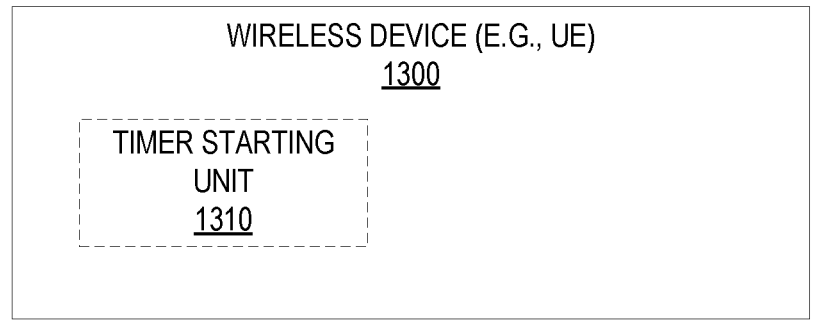
FIG. 13 is a block diagram of a wireless device according to yet other embodiments.

FIG. 13 illustrates a schematic block diagram of a wireless device 1300 (e.g., wireless device 14) in a wireless network according to still other embodiments (for example, the wireless network shown in FIG. 20). As shown, the wireless device 1300 implements various functional means, units, or modules, e.g., via the processing circuitry 1010 in FIG. 10 and/or via software code. These functional means, units, or modules, e.g., for implementing the method(s) herein, include, for instance, a timer starting unit 1310 for starting a timer 28 upon detecting physical layer problems for a serving cell of the wireless device, when one or more conditions 30 have already been fulfilled.

Figure 14:
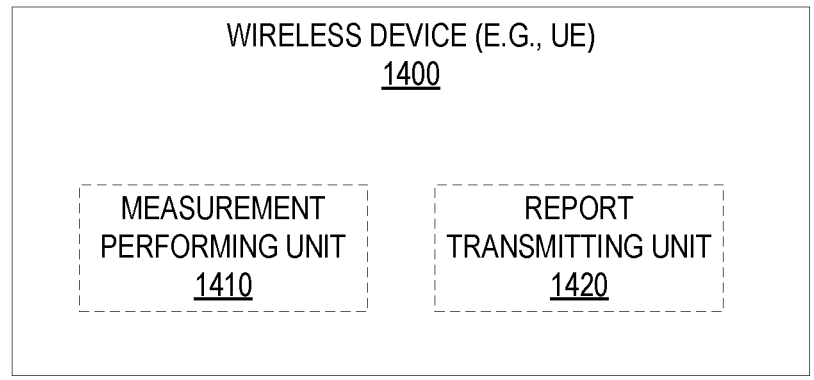
FIG. 14 is a block diagram of a wireless device according to further embodiments.

FIG. 14 illustrates a schematic block diagram of a wireless device 1400 (e.g., wireless device 14) in a wireless network according to still other embodiments (for example, the wireless network shown in FIG. 20). As shown, the wireless device 1400 implements various functional means, units, or modules, e.g., via the processing circuitry 1010 in FIG. 10 and/or via software code. These functional means, units, or modules, e.g., for implementing the method(s) herein, include, for instance, a measurement performing unit 1410 for performing a measurement. Also included may be a report transmitting unit 1420 for transmitting a measurement report that reports the measurement and that indicates a status of a timer 28.

Figure 15:
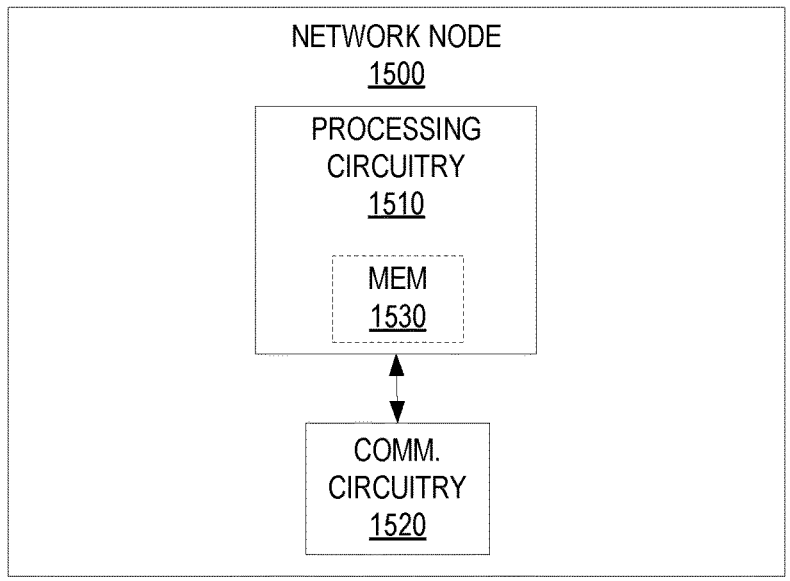
FIG. 15 is a block diagram of a network node according to some embodiments.

FIG. 15 illustrates a network node 1500 (e.g., radio network node 12-1) as implemented in accordance with one or more embodiments. The network node may be a radio network node. As shown, the network node 1500 includes processing circuitry 1510 and communication circuitry 1520. The communication circuitry 1520 is configured to transmit and/or receive information to and/or from one or more other nodes, e.g., via any communication technology. The processing circuitry 1510 is configured to perform processing described above, e.g., in any of FIGS. 8-9, such as by executing instructions stored in memory 1530. The processing circuitry 1510 in this regard may implement certain functional means, units, or modules.

Figure 16:
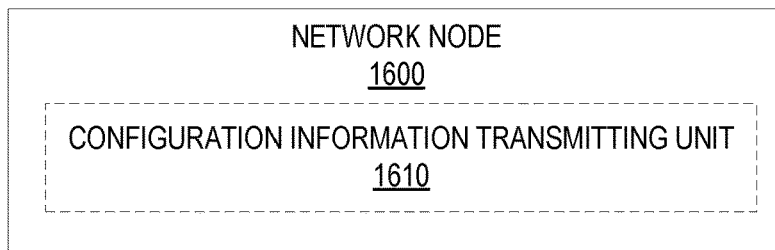
FIG. 16 is a block diagram of a network node according to other embodiments.

FIG. 16 illustrates a schematic block diagram of a network node 1600 (e.g., radio network node 12-1) in a wireless network according to still other embodiments (for example, the wireless network shown in FIG. 20). As shown, the network node 1600 implements various functional means, units, or modules, e.g., via the processing circuitry 1510 in FIG. 15 and/or via software code. These functional means, units, or modules, e.g., for implementing the method(s) herein, include for instance a configuration information transmitting unit 1610 for transmitting, to a wireless device, configuration information that configures a timer 28 at the wireless device to start when each of multiple conditions 30 have been fulfilled at the wireless device and physical layer problems for a serving cell of the wireless device have been detected by the wireless device.

Figure 17:
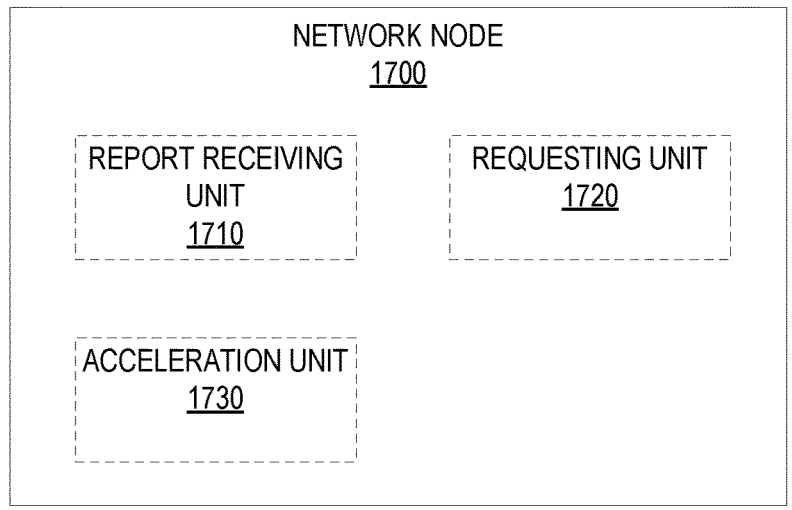
FIG. 17 is a block diagram of a network node according to still other embodiments.

FIG. 17 illustrates a schematic block diagram of a network node 1700 (e.g., radio network node 12-1) in a wireless network according to still other embodiments (for example, the wireless network shown in FIG. 20). As shown, the network node 1700 implements various functional means, units, or modules, e.g., via the processing circuitry 1510 in FIG. 15 and/or via software code. These functional means, units, or modules, e.g., for implementing the method(s) herein, include for instance a report receiving unit 1710 for receiving from a wireless device a measurement report that reports a measurement performed by the wireless device and that indicates a status of a timer 28 at the wireless device.

Also included may be a requesting unit 1720 for, based on the measurement report indicating that the timer 28 is running at the wireless device, requesting a radio network node to transmit a certain type of handover command to the wireless device. Alternatively or additionally, an acceleration unit 1730 may be included for, based on the measurement report indicating that the timer 28 is running at the wireless device, accelerating transmission of a downlink message to the wireless device that prevents the wireless device from declaring radio link failure.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Radio link failure (RLF) avoidance has been studied intensely in Long Term Evolution (LTE) and several enhancements are standardized in this aspect. However, in certain scenarios, the RLF is unavoidable with the existing robustness features and it is desirable to have as short of an interruption time as possible for user equipments (UEs).

Figure 18A:
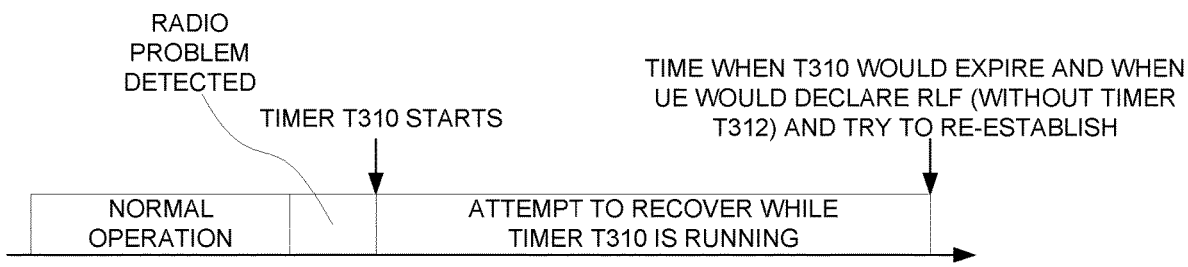
FIG. 18A is a timing diagram of operation of a wireless device with a T310 timer according to some embodiments.

In this regard, a UE in LTE maintains a so-called T310 timer. As shown in FIG. 18A, the UE starts the T310 timer when the UE detects physical layer problems (also referred to as radio problems) for the UE's serving cell. Such physical layer problems may for instance include that the UE is out-of-sync towards its serving cell. The UE may detect it is out-of-sync upon the UE receiving a certain number of consecutive "out-of-sync" indications for the serving cell from lower layers. Before receiving this number of consecutive out-of-sync indications, the UE may be considered as being in normal operation, without any physical layer problems, i.e., in-sync. In any event, while the T310 timer is running, the UE attempts to recover the radio link. When the T310 timer expires, as shown, the UE at that point declares RLF and tries to re-establish its connection to the network (by initiating the connection re-establishment procedure).

Figure 18B:
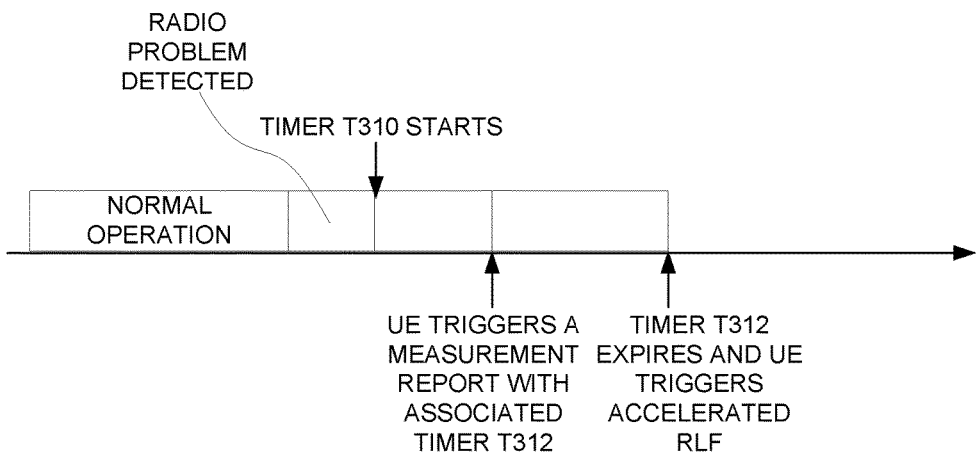
FIG. 18B is a timing diagram of operation of a wireless device with a T312 timer according to some embodiments.

Use of a timer T312 accelerates RLF declaration as shown in FIG. 18B. While the timer T310 is running, the UE starts T312 upon triggering a measurement report for a measurement identity for which T312 has been configured. When the timer T312 expires while the timer T310 is still running, the UE initiates the connection re-establishment procedure, i.e., at a time earlier than in FIG. 18A without the timer T312. That is, when the timer T312 is configured and if T310 is running, upon sending the measurement report, the UE shall declare the RLF and start with the re-establishment procedure upon the expiry of T312 value, thus reducing the interruption time for the UE.

As seen, then, the timer T312 is heretofore configured for a certain measurement identity. Specifically in this regard, the network in LTE may provide a so-called measurement configuration to the UE. A measurement configuration includes a list of measurement objects, a list of reporting configurations, a list of measurement identities, quantity configurations, and measurement gaps. A measurement object is an object on which the UE shall perform measurements. Such an object may for instance be a frequency/time location and subcarrier spacing of reference signals to be measured. Or, for inter radio access technology Evolved UMTS Terrestrial Radio Access (E-UTRA) measurements, such an object may be a single E-UTRA carrier frequency.

There may be one or multiple reporting configurations per measurement object. Each reporting configuration consists of: (i) a reporting criterion that triggers the UE to send a measurement report, on a periodic or one-time basis; (ii) a type of reference signal that the UE uses for beam and cell measurement results (e.g., Synchronization Signal/Physical Broadcast Channel Block or Channel State Information Reference Signal); and (iii) a reporting format that indicates the quantities per cell and per beam that the UE is to include in a measurement report (e.g., reference signal received power, RSRP) and other association information such as the maximum number of cells and the maximum number of beams to report.

Each measurement identity in the measurement configuration links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

A quantity configuration defines the measurement filtering configuration used for all event evaluation and related reporting of that measurement type. For New Radio (NR) measurements, the network may configure up to 2 quantity configurations with a reference in the NR measurement object to the configuration that is to be used. In each configuration, different filter coefficients can be configured for different measurement quantities, for different reference signal types, and for measurements per cell and per beam.

Measurement gaps are periods that the UE may use to perform measurements. That is, no uplink or downlink transmissions are scheduled in these periods.

More specifically with regard to reporting configurations in LTE, the network can configure the UE with information regarding when the UE shall send a measurement report to the network and what information do the UE include in the measurement report. LTE supports both event triggered and periodical reporting of measurement reports. In the case of event triggered measurement reports, the network can choose either the RSRP, reference signal received quality (RSRQ), or signal-to-interference-plus-noise (SINR) as the triggering quantities.

A Radio Resource Control (RRC) message in the form of the ReportConfigEUTRA information element (IE) specifies the reporting configuration for E-UTRA. In particular, the ReportConfigEUTRA IE specifies criteria for triggering of an E UTRA measurement reporting event. The EUTRA measurement reporting events concerning cell-specific reference signals (CRS) are labelled AN with N equal to 1, 2 and so on:

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour becomes better than another absolute threshold2.

Event A6: Neighbour becomes amount of offset better than SCell.

The E UTRA measurement reporting events concerning CSI-RS are labelled CN with N equal to 1 and 2.

Event C1: CSI-RS resource becomes better than absolute threshold;

Event C2: CSI-RS resource becomes amount of offset better than reference CSI-RS resource.

The American National Standards Institute (ANSI) encoding of the ReportConfigEUTRA IE has heretofore been encoded in the following way.

| ReportConfigEUTRA Information Element |
| --- |

```
-- ASN1START
ReportConfigEUTRA ::=            SEQUENCE {
    triggerType                      CHOICE {
        event                            SEQUENCE {
            eventId                          CHOICE {
                eventA1                          SEQUENCE {
                    a1-Threshold                     ThresholdEUTRA
                },
                eventA2                          SEQUENCE {
                    a2-Threshold                     ThresholdEUTRA
                },
                eventA3                          SEQUENCE {
                    a3-Offset                        INTEGER (-30..30),
                    reportOnLeave                    BOOLEAN
                },
                eventA4                          SEQUENCE {
                    a4-Threshold                     ThresholdEUTRA
                },
                eventA5                          SEQUENCE {
                    a5-Threshold1                    ThresholdEUTRA,
                    a5-Threshold2                    ThresholdEUTRA
                },
                ...,
                eventA6-r10                      SEQUENCE {
                    a6-Offset-r10                    INTEGER (-30..30),
                    a6-ReportOnLeave-r10             BOOLEAN
                },
                eventC1-r12                      SEQUENCE {
                    c1-Threshold-r12                 ThresholdEUTRA-v1250,
                    c1-ReportOnLeave-r12             BOOLEAN
                },
                eventC2-r12                      SEQUENCE {
                    c2-RefCSI-RS-r12                 MeasCSI-RS-Id-r12,
                    c2-Offset-r12                    INTEGER (-30..30),
                    c2-ReportOnLeave-r12             BOOLEAN
                }
            },
            hysteresis                       Hysteresis,
            timeToTrigger                    TimeToTrigger
        },
        periodical                       SEQUENCE {
            purpose                          ENUMERATED {
                                                 reportStrongestCells,
reportCGI}
        }
    },
    triggerQuantity                  ENUMERATED {rsrp, rsrq},
    reportQuantity                   ENUMERATED {sameAsTriggerQuantity, both},
    maxReportCells                   INTEGER (1..maxCellReport),
    reportInterval                   ReportInterval,
    reportAmount                     ENUMERATED {r1, r2, r4, r8, r16, r32, r64, infinity},
    ...,
    [[ si-RequestForHO-r9            ENUMERATED {setup}     OPTIONAL,
       -- Cond reportCGI
       ue-RxTxTimeDiffPeriodical-r9  ENUMERATED {setup}     OPTIONAL --
Need OR
    ]],
```

```
ReportConfigEUTRA Information Element

[[ includeLocationInfo-r10        ENUMERATED {true}
OPTIONAL,   -- Need OR
    reportAddNeighMeas-r10        ENUMERATED {setup}
OPTIONAL -- Need OR
]],
[[  alternativeTimeToTrigger-r12  CHOICE {
        release                       NULL,
        setup                         TimeToTrigger
    }                                             OPTIONAL,   -- Need
ON
    useT312-r12                   BOOLEAN    OPTIONAL,   --
Need ON
    usePSCell-r12                 BOOLEAN    OPTIONAL,   --
Need ON
    aN-Threshold1-v1250           RSRQ-RangeConfig-r12
OPTIONAL,   -- Need ON
    a5-Threshold2-v1250           RSRQ-RangeConfig-r12
OPTIONAL,   -- Need ON
    reportStrongestCSI-RSs-r12    BOOLEAN    OPTIONAL,   --
Need ON
    reportCRS-Meas-r12            BOOLEAN    OPTIONAL,   --
Need ON
    triggerQuantityCSI-RS-r12     BOOLEAN    OPTIONAL    --
Need ON
]],
[[  reportSSTD-Meas-r13           BOOLEAN    OPTIONAL,
-- Need ON
    rs-sinr-Config-r13            CHOICE {
        release                       NULL,
        setup                         SEQUENCE {
            triggerQuantity-v1310        ENUMERATED {sinr}
OPTIONAL,   -- Need ON
            aN-Threshold1-r13            RS-SINR-Range-r13
OPTIONAL,   -- Need ON
            a5-Threshold2-r13            RS-SINR-Range-r13
OPTIONAL,   -- Need ON
            reportQuantity-v1310         ENUMERATED {rsrpANDsinr,
rsrqANDsinr, all}
        }
    }                                             OPTIONAL,
-- Need ON
    useWhiteCellList-r13          BOOLEAN
OPTIONAL,   -- Need ON
    measRSSI-ReportConfig-r13     MeasRSSI-ReportConfig-r13
OPTIONAL,   -- Need ON
    includeMultiBandInfo-r13      ENUMERATED {true}
OPTIONAL,   -- Cond reportCGI
    ul-DelayConfig-r13            UL-DelayConfig-r13
OPTIONAL -- Need ON
]],
[[  ue-RxTxTimeDiffPeriodicalTDD-r13   BOOLEAN
OPTIONAL -- Need ON
]]
}
RSRQ-RangeConfig-r12 ::=          CHOICE {
    release                           NULL,
    setup                             RSRQ-Range-v1250
}
ThresholdEUTRA ::=                CHOICE{
    threshold-RSRP                        RSRP-Range,
    threshold-RSRQ                        RSRQ-Range
}
ThresholdEUTRA-v1250 ::=          CSI-RSRP-Range-r12
MeasRSSI-ReportConfig-r13 ::=   SEQUENCE {
    channelOccupancyThreshold-r13     RSSI-Range-r13
    OPTIONAL -- Need OR
}
-- ASN1STOP
```

Returning to the T312 timer, the LTE RRC specification specifies that, if security has been activated successfully, the UE shall perform the following for each measId included in the measIdList within VarMeasConfig. Under certain conditions, the UE is to start timer T312 with the value configured in the corresponding measObject (i) if the UE supports T312 and if use T312 is included for this event and if T310 is running; and (ii) if T312 is not running. The certain conditions include (i) if the triggerType is set to event and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include an measurement reporting entry for this measId (a first cell triggers the event); (ii) if the triggerType is set to event and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event): or (iii) if the triggerType is set to event and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event. After starting the T312 timer, the UE is to initiate the measurement reporting procedure.

Figure 19:
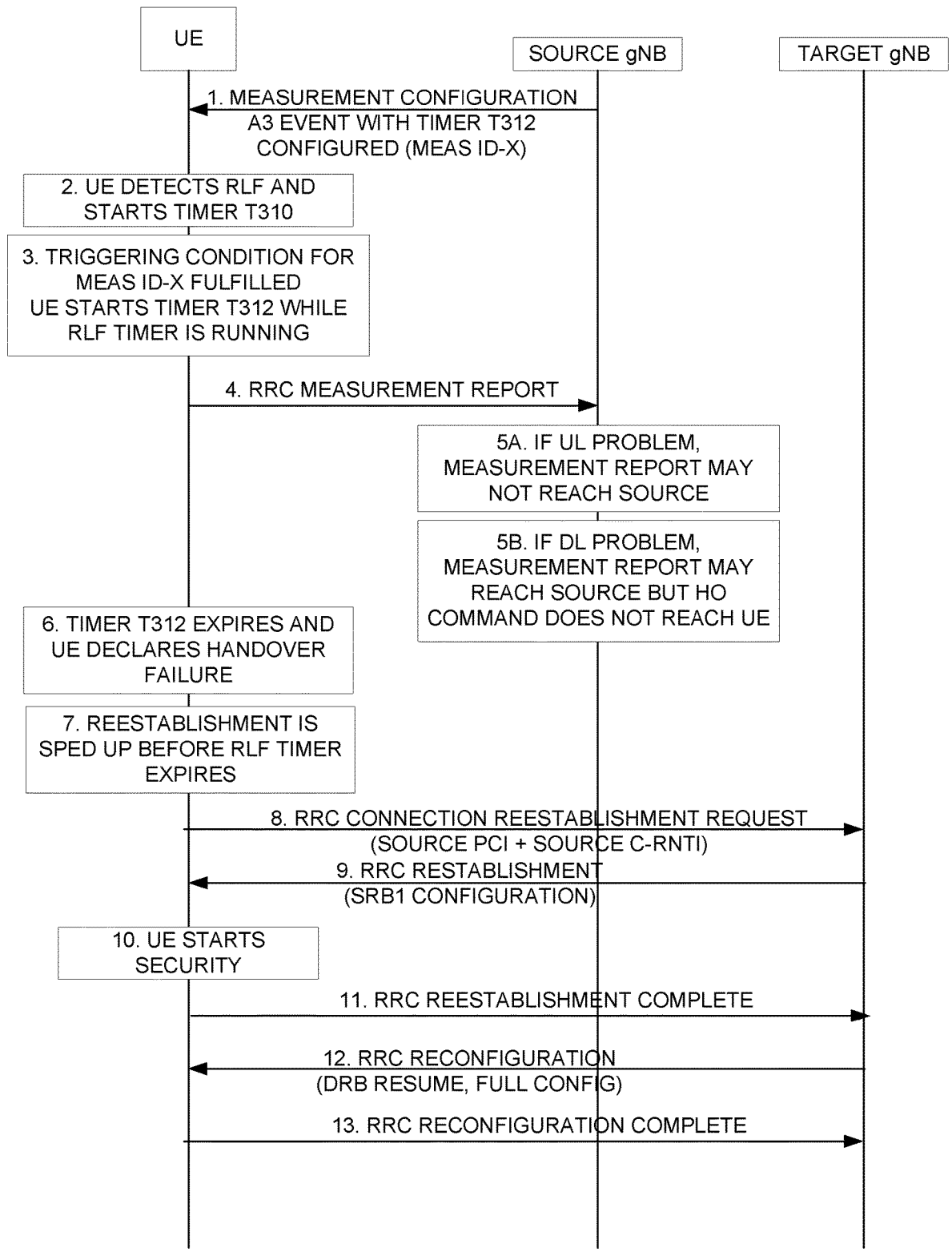

An example of the use of timer T312 is also shown in the timing diagram of FIG. 19. As shown, the source gNB transmits a measurement configuration to the UE (Step 1). The measurement configuration configures a measurement for the A3 event with timer T312 and with a measurement identity of ID-X. The UE detects RLF and starts timer T310 (Step 2). The triggering condition for measurement identity ID-X is fulfilled, and the UE starts timer T312 while the RLF timer (i.e., timer T310) is running (Step 3). The UE then transmits an RRC measurement report to the source gNB (Step 4). If there is an uplink (UL) problem, this measurement report may not reach the source gNB (Step 5A). Alternatively, if there is a downlink (DL) problem, the measurement report may reach the source gNB but a handover (HO) command may not reach the UE (Step 5B). Due to the UL problem or the DL problem, the timer T312 at the UE expires, and the UE declares handover failure (Step 6). The UE then speeds up reestablishment before the RLF timer (T310) expires (Step 7). As a result, the UE transmits an RRC connection reestablishment request to the target gNB, with a source physical cell identity (PCI) as well as a source cell radio network temporary identity (C-RNTI) (Step 8). The target gNB responds with an RRC reestablishment message, including a signaling radio bearer 1 (SRB1) configuration (Step 9). The UE then starts security (Step 10). After starting security, the UE transmits an RRC reestablishment complete message to the target gNB (Step 11). In response, the UE receives an RRC reconfiguration message, including a data radio bearer (DRB) resume parameter and a full configuration (Step 12). The UE then transmits an RRC reconfiguration complete message to the target gNB (Step 13).

There currently exist certain challenge(s). The network can make a handover decision based on one or more measurement reports, where different reporting configurations have different triggering quantities. In such a scenario, the network configures more than one measurement reporting configuration with different triggering quantities. To give one example, the network may configure the UE with a given frequency (associated with a measurement object) and associate that with two report configurations associated to an A3 event. The first report configuration is for an RSRP trigger quantity, and the second report configuration is for an RSQ trigger quantity (where each of these would have an associated measurement identifier).

But the existing configuration approach prevents the network from configuring the T312 timer associated with these reporting configurations. The network does not want the UE to declare RLF because of an expiry of the T312 timer related to one of the measurement reports (only associated to a single quantity) when the network is waiting for the reception of another measurement report before executing the handover. This is recognized herein as a limitation on the network side as to which reporting configurations can be configured with the T312 timer and thus potentially increases the UE interruption time when the network refrains from configuring this timer.

Embodiments described herein provide solutions to these and/or other problems. According to some embodiments, the network configures the T312 timer (e.g., as an example of timer 28 in FIG. 1) to be applicable to more than one trigger, different from the existing case where the timer is only associated with a single reporting configuration that is only associated with a single quantity. In other words, the timer according to some embodiments may only be started when more than one condition is fulfilled, i.e., multiple triggers.

There can be different multiple triggers. Examples of triggers with multiple trigger quantities include: (RSRP and RSRQ), (RSRP and SINR), (RSRQ and SINR), (RSRP, RSRQ and SINR). Examples of triggers with multiple trigger reference signals include SSB and CSI-RS reference signals defined in the NR standard: (RSRP based on SSB and RSRP based on CSI-RS), (RSRQ based on SSB and RSRQ based on CSI-RS), (SINR based on SSB and SINR based on CSI-RS). Examples of triggers with multiple trigger quantities with different reference signals and trigger quantities include: (RSRP based on SSB and RSRQ based on CSI-RS), (RSRQ based on SSB and SINR based on CSI-RS), etc.

Embodiments described herein therefore are generally directed to improving measurement configurations that would affect both eNB and UE nodes. The update may be important specifically for mobility enhancement purposes and improved Network/UE performance.

Advantages of certain embodiments include providing the network flexibility for configuring combinations of reporting configurations, the triggering of which will lead to the running of the T312 timer at the UE (when T300 is also running).

More specifically, consider a specific example of the measurement configuration 44 shown in FIG. 3A. In one embodiment, the measConfig provides a list of reportConfig combinations. Upon triggering these combinations of these measurement reports, the UE shall trigger the T312 timer, provided the T310 timer is running. Under this implementation, one could remove the use T321 field from the reportConfig.

When this embodiment is implemented, the UE checks the timerT312TriggerConfig values as to whether there are any combinations of reporting configurations for which the T312 is applicable. When the timerT312TriggerConfig is configured, there can be a list of T312TriggerConfig with each of the T312TriggerConfig containing a list of reportConfigIDs. When all the triggering conditions as configured for all of the reportConfigIDs in a T312TriggerConfig is triggered, the UE initiates its T312 timer provided T310 is running.

The MeasConfig information element in this embodiment may be encoded in the following way, wherein the MeasConfig information element is a specific implementation of the measurement configuration 44 in FIG. 3A.

| MeasConfig information element |
| --- |

```
-- ASN1START
MeasConfig ::=                    SEQUENCE {
     -- Measurement objects
     measObjectToRemoveList     MeasObjectToRemoveList     OPTIONAL,--
Need ON
     measObjectToAddModList     MeasObjectToAddModList     OPTIONAL,--
Need ON
     -- Reporting configurations
     reportConfigToRemoveList   ReportConfigToRemoveList   OPTIONAL,--
Need ON
     reportConfigToAddModList   ReportConfigToAddModList   OPTIONAL,--
Need ON
     -- Measurement identities
     measIdToRemoveList         MeasIdToRemoveList         OPTIONAL,--
Need ON
     measIdToAddModList         MeasIdToAddModList         OPTIONAL,--
Need ON
     -- Other parameters
     quantityConfig             QuantityConfig             OPTIONAL,--
Need ON
     measGapConfig              MeasGapConfig              OPTIONAL,--
Need ON
     s-Measure                  RSRP-Range                 OPTIONAL,--
Need ON
     preRegistrationInfoHRPD    PreRegistrationInfoHRPD    OPTIONAL, --
Need OP
     speedStatePars             CHOICE {
        release                     NULL,
        setup                       SEQUENCE {
           mobilityStateParameters     MobilityStateParameters,
           timeToTrigger-SF            SpeedStateScaleFactors
        }
     }                                                      OPTIONAL,--
Need ON
     ...,
     [[ measObjectToAddModList-v9e0   MeasObjectToAddModList-v9e0
        OPTIONAL -- Need ON
     ]],
     [[ allowInterruptions-r11   BOOLEAN                    OPTIONAL--
Need ON
     ]],
     [[ measScaleFactor-r12      CHOICE {
           release                 NULL,
           setup                   MeasScaleFactor-r12
        }                                                   OPTIONAL,--
Need ON
        measIdToRemoveListExt-r12   MeasIdToRemoveListExt-r12    OPTIONAL,-
- Need ON
        measIdToAddModListExt-r12   MeasIdToAddModListExt-r12    OPTIONAL,-
- Need ON
        measRSRQ-OnAllSymbols-r12      BOOLEAN
        OPTIONAL -- Need ON
     ]],
[[
        measObjectToRemoveListExt-r13      MeasObjectToRemoveListExt-r13
        OPTIONAL,   -- Need ON
        measObjectToAddModListExt-r13      MeasObjectToAddModListExt-r13
        OPTIONAL,   -- Need ON
        measIdToAddModList-v1310           MeasIdToAddModList-v1310
        OPTIONAL,   -- Need ON
        measIdToAddModListExt-v1310        MeasIdToAddModListExt-v1310
        OPTIONAL    -- Need ON
     ]]
     [[ timerT312TriggerConfig-r15   TimerT312TriggerConfig-r15   OPTIONAL,--
Need M
     ]]
}
MeasIdToRemoveList ::=          SEQUENCE (SIZE (1..maxMeasId)) OF MeasId
MeasIdToRemoveListExt-r12 ::=   SEQUENCE (SIZE (1..maxMeasId)) OF MeasId-
v1250
MeasObjectToRemoveList ::=      SEQUENCE (SIZE (1..maxObjectId)) OF
MeasObjectId
MeasObjectToRemoveListExt-r13 ::= SEQUENCE (SIZE (1..maxObjectId)) OF
MeasObjectId-v1310
ReportConfigToRemoveList ::=    SEQUENCE (SIZE (1..maxReportConfigId)) OF
ReportConfigId
TimerT312TriggerConfig-r15 ::=  SEQUENCE (SIZE (1.. maxReportConfigId)) OF
T312TriggerConfig-r15-r15
```

| MeasConfig information element |
| --- |
| T312TriggerConfig-r15 ::=              SEQUENCE {<br>  reportConfigId-r15     SEQUENCE (SIZE (1..maxReportConfigId)) OF ReportConfigId-r15<br>-- ASN1STOP |

Consider now a specific example of the reporting configuration 52 illustrated in FIG. 3B. In this example, the reportConfig includes a quantityList which provides a list of measurement quantities, e.g., RSRP, RSRQ, SINR, etc. Upon fulfilling the triggering criterion based on these quantities, the UE shall initiate the T312 timer (provided T310 is running). This embodiment can be configured for those events which involve related measurement comparisons (A3, A6, C2). The UE triggers the measurement report based on triggerQuantity but the UE triggers the T312 based on the quantities configured in TimerT312QuantityList-r15.

The ReportConfigEUTRA information element in this embodiment may be encoded in the following way, wherein the ReportConfigEUTRA information element is a specific example of the reporting configuration 52 shown in FIG. 3B.

| ReportConfigEUTRA information element |
| --- |
| -- ASN1START<br>ReportConfigEUTRA ::=                    SEQUENCE {<br>  triggerType                             CHOICE {<br>    event                                 SEQUENCE {<br>      eventId                             CHOICE {<br>        eventA1                           SEQUENCE {<br>          a1-Threshold                    ThresholdEUTRA<br>        },<br>        eventA2                           SEQUENCE {<br>          a2-Threshold                    ThresholdEUTRA<br>        },<br>        eventA3                           SEQUENCE {<br>          a3-Offset                       INTEGER (-30..30),<br>          reportOnLeave                   BOOLEAN<br>        },<br>        eventA4                           SEQUENCE {<br>          a4-Threshold                    ThresholdEUTRA<br>        },<br>        eventA5                           SEQUENCE {<br>          a5-Threshold1                   ThresholdEUTRA,<br>          a5-Threshold2                   ThresholdEUTRA<br>        },<br>        ...,<br>        eventA6-r10                       SEQUENCE {<br>          a6-Offset-r10                   INTEGER (-30..30),<br>          a6-ReportOnLeave-r10            BOOLEAN<br>        },<br>    eventC1-r12              SEQUENCE {<br>      c1-Threshold-r12                    ThresholdEUTRA-v1250,<br>      c1-ReportOnLeave-r12                BOOLEAN<br>    },<br>    eventC2-r12                           SEQUENCE {<br>      c2-RefCSI-RS-r12                    MeasCSI-RS-Id-r12,<br>      c2-Offset-r12                       INTEGER (-30..30),<br>      c2-ReportOnLeave-r12                BOOLEAN<br>    }<br>    },<br>    hysteresis                            Hysteresis,<br>    timeToTrigger                         TimeToTrigger<br>  },<br>  periodical                              SEQUENCE {<br>    purpose                               ENUMERATED {<br>      reportStrongestCells,<br>reportCGI}<br>  }<br>},<br>  triggerQuantity                         ENUMERATED {rsrp, rsrq},<br>  reportQuantity                          ENUMERATED {sameAsTriggerQuantity, both},<br>  maxReportCells                          INTEGER (1..maxCellReport),<br>  reportInterval                          ReportInterval,<br>  reportAmount                            ENUMERATED {r1, r2, r4, r8, r16, r32, r64, infinity},<br>  ..., |

-continued

| ReportConfigEUTRA information element |
|---|
| ```
    [[ si-RequestForHO-r9    ENUMERATED {setup}      OPTIONAL,-- Cond reportCGI
       ue-RxTxTimeDiffPeriodical-r9  ENUMERATED {setup}     OPTIONAL-- Need OR
    ]],
    [[ includeLocationInfo-r10       ENUMERATED {true}   OPTIONAL,-- Need OR
       reportAddNeighMeas-r10        ENUMERATED {setup}     OPTIONAL-- Need OR
    ]],
    [[ alternativeTimeToTrigger-r12  CHOICE {
         release                       NULL,
         setup                         TimeToTrigger
       }                                                 OPTIONAL,   -- Need ON
       useT312-r12                   BOOLEAN        OPTIONAL,   -- Need ON
       usePSCell-r12                 BOOLEAN        OPTIONAL,   -- Need ON
       aN-Threshold1-v1250    RSRQ-RangeConfig-r12   OPTIONAL,   -- Need ON
       a5-Threshold2-v1250    RSRQ-RangeConfig-r12   OPTIONAL,   -- Need ON
       reportStrongestCSI-RSs-r12    BOOLEAN        OPTIONAL,   -- Need ON
       reportCRS-Meas-r12            BOOLEAN        OPTIONAL,   -- Need ON
       triggerQuantityCSI-RS-r12     BOOLEAN        OPTIONAL    -- Need ON
    ]],
    [[ reportSSTD-Meas-r13           BOOLEAN        OPTIONAL, -- Need ON
       rs-sinr-Config-r13            CHOICE {
         release                       NULL,
         setup                         SEQUENCE {
           triggerQuantity-v1310       ENUMERATED {sinr}   OPTIONAL,-- Need ON
           aN-Threshold1-r13           RS-SINR-Range-r13   OPTIONAL, --Need ON
           a5-Threshold2-r13           RS-SINR-Range-r13   OPTIONAL, --Need ON
           reportQuantity-v1310        ENUMERATED {rsrpANDsinr, rsrqANDsinr, all}
         }
       }                                                 OPTIONAL,-- Need ON
       useWhiteCellList-r13          BOOLEAN        OPTIONAL,-- Need ON
       measRSSI-ReportConfig-r13   MeasRSSI-ReportConfig-r13   OPTIONAL,-- Need ON
       includeMultiBandInfo-r13      ENUMERATED {true}    OPTIONAL,-- Cond reportCGI
       ul-DelayConfig-r13            UL-DelayConfig-r13   OPTIONAL -- Need ON
    ]],
    [[ ue-RxTxTimeDiffPeriodicalTDD-r13  BOOLEAN        OPTIONAL -- Need ON
    ]]
    [[ timerT312QuantityList-r15  TimerT312QuantityList-r15    OPTIONAL -- Need ON
    ]]
}
RSRQ-RangeConfig-r12 ::=    CHOICE {
    release                   NULL,
    setup                     RSRQ-Range-v1250
}
ThresholdEUTRA ::=          CHOICE{
    threshold-RSRP              RSRP-Range,
    threshold-RSRQ              RSRQ-Range
}
ThresholdEUTRA-v1250 ::=    CSI-RSRP-Range-r12
MeasRSSI-ReportConfig-r13 ::=   SEQUENCE {
    channelOccupancyThreshold-r13    RSSI-Range-r13   OPTIONAL -- Need OR
}
``` |

-continued

| ReportConfigEUTRA information element |
| --- |
| TimerT312QuantityList-r15 ::= SEQUENCE {<br>  rsrp        BOOLEAN         OPTIONAL,  -- Need OR<br>  rsrq        BOOLEAN         OPTIONAL,  -- Need OR<br>  sinr         BOOLEAN         OPTIONAL   -- Need OR<br>}<br>-- ASN1STOP |

In an additional embodiment, the UE triggers the T312 timer if it detects the triggering of the T310 timer, provided the corresponding measurement report(s) have already been sent to the network. This will provide further usage of the T312 timer wherein it is not restricted to start only at the time of sending the corresponding measurement report but also when it has already sent the measurement report (when T310 was not running) but later T310 is triggered.

In an independent embodiment, the UE can include the status of T310 in the measurement report i.e., whether the UE has triggered the timer or not. Additionally, if the timer has been triggered already, the UE can report the status of the timer in the measurement report. This can be applicable for both types of measurement reports, those that include T312 configuration and those that do not.

Some embodiments herein are applicable for cloud implementation of eNB/gNB as well as distributed implementation.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network 2006, network nodes 2060 and 2060b, and WDs 2010, 2010b, and 2010c. In practice, a wireless network may further include any additional elements suitable to support communication between wireless devices or between a wireless device and another communication device, such as a landline telephone, a service provider, or any other network node or end device. Of the illustrated components, network node 2060 and wireless device (WD) 2010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2060 and WD 2010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node 2060 includes processing circuitry 2070, device readable medium 2080, interface 2090, auxiliary equipment 2084, power source 2086, power circuitry 2087, and antenna 2062. Although network node 2060 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2060 are depicted as single boxes located within a larger box, or nested within multiple boxes, in practice, a network node may comprise multiple different physical components that make up a single illustrated component (e.g., device readable medium 2080 may comprise multiple separate hard drives as well as multiple RAM modules).

Similarly, network node 2060 may be composed of multiple physically separate components (e.g., a NodeB component and a RNC component, or a BTS component and a BSC component, etc.), which may each have their own respective components. In certain scenarios in which network node 2060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2060 may be configured to support multiple radio access technologies (RATs). In such embodiments, some components may be duplicated (e.g., separate device readable medium 2080 for the different RATs) and some components may be reused (e.g., the same antenna 2062 may be shared by the RATs). Network node 2060 may also include multiple sets of the various illustrated components for different wireless technologies integrated into network node 2060, such as, for example, GSM, WCDMA, LTE, NR, WiFi, or Bluetooth wireless technologies. These wireless technologies may be integrated into the same or different chip or set of chips and other components within network node 2060.

Processing circuitry 2070 is configured to perform any determining, calculating, or similar operations (e.g., certain obtaining operations) described herein as being provided by a network node. These operations performed by processing circuitry 2070 may include processing information obtained by processing circuitry 2070 by, for example, converting the obtained information into other information, comparing the obtained information or converted information to information stored in the network node, and/or performing one or more operations based on the obtained information or converted information, and as a result of said processing making a determination.

Processing circuitry 2070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2060 components, such as device readable medium 2080, network node 2060 functionality. For example, processing circuitry 2070 may execute instructions stored in device readable medium 2080 or in memory within processing circuitry 2070. Such functionality may include providing any of the various wireless features, functions, or benefits discussed herein. In some embodiments, processing circuitry 2070 may include a system on a chip (SOC).

In some embodiments, processing circuitry 2070 may include one or more of radio frequency (RF) transceiver circuitry 2072 and baseband processing circuitry 2074. In some embodiments, radio frequency (RF) transceiver circuitry 2072 and baseband processing circuitry 2074 may be on separate chips (or sets of chips), boards, or units, such as radio units and digital units. In alternative embodiments, part or all of RF transceiver circuitry 2072 and baseband processing circuitry 2074 may be on the same chip or set of chips, boards, or units In certain embodiments, some or all of the functionality described herein as being provided by a network node, base station, eNB or other such network device may be performed by processing circuitry 2070 executing instructions stored on device readable medium 2080 or memory within processing circuitry 2070. In alternative embodiments, some or all of the functionality may be provided by processing circuitry 2070 without executing instructions stored on a separate or discrete device readable medium, such as in a hard-wired manner. In any of those embodiments, whether executing instructions stored on a device readable storage medium or not, processing circuitry 2070 can be configured to perform the described functionality. The benefits provided by such functionality are not limited to processing circuitry 2070 alone or to other components of network node 2060, but are enjoyed by network node 2060 as a whole, and/or by end users and the wireless network generally.

Device readable medium 2080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2070. Device readable medium 2080 may store any suitable instructions, data or information, including a computer program, software, an application including one or more of logic, rules, code, tables, etc. and/or other instructions capable of being executed by processing circuitry 2070 and, utilized by network node 2060. Device readable medium 2080 may be used to store any calculations made by processing circuitry 2070 and/or any data received via interface 2090. In some embodiments, processing circuitry 2070 and device readable medium 2080 may be considered to be integrated.

Interface 2090 is used in the wired or wireless communication of signalling and/or data between network node 2060, network 2006, and/or WDs 2010. As illustrated, interface 2090 comprises port(s)/terminal(s) 2094 to send and receive data, for example to and from network 2006 over a wired connection. Interface 2090 also includes radio front end circuitry 2092 that may be coupled to, or in certain embodiments a part of, antenna 2062. Radio front end circuitry 2092 comprises filters 2098 and amplifiers 2096. Radio front end circuitry 2092 may be connected to antenna 2062 and processing circuitry 2070. Radio front end circuitry may be configured to condition signals communicated between antenna 2062 and processing circuitry 2070. Radio front end circuitry 2092 may receive digital data that is to be sent out to other network nodes or WDs via a wireless connection. Radio front end circuitry 2092 may convert the digital data into a radio signal having the appropriate channel and bandwidth parameters using a combination of filters 2098 and/or amplifiers 2096. The radio signal may then be transmitted via antenna 2062. Similarly, when receiving data, antenna 2062 may collect radio signals which are then converted into digital data by radio front end circuitry 2092. The digital data may be passed to processing circuitry 2070. In other embodiments, the interface may comprise different components and/or different combinations of components.

In certain alternative embodiments, network node 2060 may not include separate radio front end circuitry 2092, instead, processing circuitry 2070 may comprise radio front end circuitry and may be connected to antenna 2062 without separate radio front end circuitry 2092. Similarly, in some embodiments, all or some of RF transceiver circuitry 2072 may be considered a part of interface 2090. In still other embodiments, interface 2090 may include one or more ports or terminals 2094, radio front end circuitry 2092, and RF transceiver circuitry 2072, as part of a radio unit (not shown), and interface 2090 may communicate with baseband processing circuitry 2074, which is part of a digital unit (not shown).

Antenna 2062 may include one or more antennas, or antenna arrays, configured to send and/or receive wireless signals. Antenna 2062 may be coupled to radio front end circuitry 2090 and may be any type of antenna capable of transmitting and receiving data and/or signals wirelessly. In some embodiments, antenna 2062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2062 may be separate from network node 2060 and may be connectable to network node 2060 through an interface or port.

Antenna 2062, interface 2090, and/or processing circuitry 2070 may be configured to perform any receiving operations and/or certain obtaining operations described herein as being performed by a network node. Any information, data and/or signals may be received from a wireless device, another network node and/or any other network equipment. Similarly, antenna 2062, interface 2090, and/or processing circuitry 2070 may be configured to perform any transmitting operations described herein as being performed by a network node. Any information, data and/or signals may be transmitted to a wireless device, another network node and/or any other network equipment.

Power circuitry 2087 may comprise, or be coupled to, power management circuitry and is configured to supply the components of network node 2060 with power for performing the functionality described herein. Power circuitry 2087 may receive power from power source 2086. Power source 2086 and/or power circuitry 2087 may be configured to provide power to the various components of network node 2060 in a form suitable for the respective components (e.g., at a voltage and current level needed for each respective component). Power source 2086 may either be included in, or external to, power circuitry 2087 and/or network node 2060. For example, network node 2060 may be connectable to an external power source (e.g., an electricity outlet) via an input circuitry or interface such as an electrical cable, whereby the external power source supplies power to power circuitry 2087. As a further example, power source 2086 may comprise a source of power in the form of a battery or battery pack which is connected to, or integrated in, power circuitry 2087. The battery may provide backup power should the external power source fail. Other types of power sources, such as photovoltaic devices, may also be used.

Alternative embodiments of network node 2060 may include additional components beyond those shown in FIG. 20 that may be responsible for providing certain aspects of the network node's functionality, including any of the functionality described herein and/or any functionality necessary to support the subject matter described herein. For example, network node 2060 may include user interface equipment to allow input of information into network node 2060 and to allow output of information from network node 2060. This may allow a user to perform diagnostic, maintenance, repair, and other administrative functions for network node 2060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2010 includes antenna 2011, interface 2014, processing circuitry 2020, device readable medium 2030, user interface equipment 2032, auxiliary equipment 2034, power source 2036 and power circuitry 2037. WD 2010 may include multiple sets of one or more of the illustrated components for different wireless technologies supported by WD 2010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2010.

Antenna 2011 may include one or more antennas or antenna arrays, configured to send and/or receive wireless signals, and is connected to interface 2014. In certain alternative embodiments, antenna 2011 may be separate from WD 2010 and be connectable to WD 2010 through an interface or port. Antenna 2011, interface 2014, and/or processing circuitry 2020 may be configured to perform any receiving or transmitting operations described herein as being performed by a WD. Any information, data and/or signals may be received from a network node and/or another WD. In some embodiments, radio front end circuitry and/or antenna 2011 may be considered an interface.

As illustrated, interface 2014 comprises radio front end circuitry 2012 and antenna 2011. Radio front end circuitry 2012 comprise one or more filters 2018 and amplifiers 2016. Radio front end circuitry 2014 is connected to antenna 2011 and processing circuitry 2020, and is configured to condition signals communicated between antenna 2011 and processing circuitry 2020. Radio front end circuitry 2012 may be coupled to or a part of antenna 2011. In some embodiments, WD 2010 may not include separate radio front end circuitry 2012; rather, processing circuitry 2020 may comprise radio front end circuitry and may be connected to antenna 2011. Similarly, in some embodiments, some or all of RF transceiver circuitry 2022 may be considered a part of interface 2014. Radio front end circuitry 2012 may receive digital data that is to be sent out to other network nodes or WDs via a wireless connection. Radio front end circuitry 2012 may convert the digital data into a radio signal having the appropriate channel and bandwidth parameters using a combination of filters 2018 and/or amplifiers 2016. The radio signal may then be transmitted via antenna 2011. Similarly, when receiving data, antenna 2011 may collect radio signals which are then converted into digital data by radio front end circuitry 2012. The digital data may be passed to processing circuitry 2020. In other embodiments, the interface may comprise different components and/or different combinations of components.

Processing circuitry 2020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2010 components, such as device readable medium 2030, WD 2010 functionality. Such functionality may include providing any of the various wireless features or benefits discussed herein. For example, processing circuitry 2020 may execute instructions stored in device readable medium 2030 or in memory within processing circuitry 2020 to provide the functionality disclosed herein.

As illustrated, processing circuitry 2020 includes one or more of RF transceiver circuitry 2022, baseband processing circuitry 2024, and application processing circuitry 2026. In other embodiments, the processing circuitry may comprise different components and/or different combinations of components. In certain embodiments processing circuitry 2020 of WD 2010 may comprise a SOC. In some embodiments, RF transceiver circuitry 2022, baseband processing circuitry 2024, and application processing circuitry 2026 may be on separate chips or sets of chips. In alternative embodiments, part or all of baseband processing circuitry 2024 and application processing circuitry 2026 may be combined into one chip or set of chips, and RF transceiver circuitry 2022 may be on a separate chip or set of chips. In still alternative embodiments, part or all of RF transceiver circuitry 2022 and baseband processing circuitry 2024 may be on the same chip or set of chips, and application processing circuitry 2026 may be on a separate chip or set of chips. In yet other alternative embodiments, part or all of RF transceiver circuitry 2022, baseband processing circuitry 2024, and application processing circuitry 2026 may be combined in the same chip or set of chips. In some embodiments, RF transceiver circuitry 2022 may be a part of interface 2014. RF transceiver circuitry 2022 may condition RF signals for processing circuitry 2020.

In certain embodiments, some or all of the functionality described herein as being performed by a WD may be provided by processing circuitry 2020 executing instructions stored on device readable medium 2030, which in certain embodiments may be a computer-readable storage medium. In alternative embodiments, some or all of the functionality may be provided by processing circuitry 2020 without executing instructions stored on a separate or discrete device readable storage medium, such as in a hard-wired manner. In any of those particular embodiments, whether executing instructions stored on a device readable storage medium or not, processing circuitry 2020 can be configured to perform the described functionality. The benefits provided by such functionality are not limited to processing circuitry 2020 alone or to other components of WD 2010, but are enjoyed by WD 2010 as a whole, and/or by end users and the wireless network generally.

Processing circuitry 2020 may be configured to perform any determining, calculating, or similar operations (e.g., certain obtaining operations) described herein as being performed by a WD. These operations, as performed by processing circuitry 2020, may include processing information obtained by processing circuitry 2020 by, for example, converting the obtained information into other information, comparing the obtained information or converted information to information stored by WD 2010, and/or performing one or more operations based on the obtained information or converted information, and as a result of said processing making a determination.

Device readable medium 2030 may be operable to store a computer program, software, an application including one or more of logic, rules, code, tables, etc. and/or other instructions capable of being executed by processing circuitry 2020. Device readable medium 2030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2020. In some embodiments, processing circuitry 2020 and device readable medium 2030 may be considered to be integrated.

User interface equipment 2032 may provide components that allow for a human user to interact with WD 2010. Such interaction may be of many forms, such as visual, audial, tactile, etc. User interface equipment 2032 may be operable to produce output to the user and to allow the user to provide input to WD 2010. The type of interaction may vary depending on the type of user interface equipment 2032 installed in WD 2010. For example, if WD 2010 is a smart phone, the interaction may be via a touch screen; if WD 2010 is a smart meter, the interaction may be through a screen that provides usage (e.g., the number of gallons used) or a speaker that provides an audible alert (e.g., if smoke is detected). User interface equipment 2032 may include input interfaces, devices and circuits, and output interfaces, devices and circuits. User interface equipment 2032 is configured to allow input of information into WD 2010, and is connected to processing circuitry 2020 to allow processing circuitry 2020 to process the input information. User interface equipment 2032 may include, for example, a microphone, a proximity or other sensor, keys/buttons, a touch display, one or more cameras, a USB port, or other input circuitry. User interface equipment 2032 is also configured to allow output of information from WD 2010, and to allow processing circuitry 2020 to output information from WD 2010. User interface equipment 2032 may include, for example, a speaker, a display, vibrating circuitry, a USB port, a headphone interface, or other output circuitry. Using one or more input and output interfaces, devices, and circuits, of user interface equipment 2032, WD 2010 may communicate with end users and/or the wireless network, and allow them to benefit from the functionality described herein.

Auxiliary equipment 2034 is operable to provide more specific functionality which may not be generally performed by WDs. This may comprise specialized sensors for doing measurements for various purposes, interfaces for additional types of communication such as wired communications etc. The inclusion and type of components of auxiliary equipment 2034 may vary depending on the embodiment and/or scenario.

Power source 2036 may, in some embodiments, be in the form of a battery or battery pack. Other types of power sources, such as an external power source (e.g., an electricity outlet), photovoltaic devices or power cells, may also be used. WD 2010 may further comprise power circuitry 2037 for delivering power from power source 2036 to the various parts of WD 2010 which need power from power source 2036 to carry out any functionality described or indicated herein. Power circuitry 2037 may in certain embodiments comprise power management circuitry. Power circuitry 2037 may additionally or alternatively be operable to receive power from an external power source; in which case WD 2010 may be connectable to the external power source (such as an electricity outlet) via input circuitry or an interface such as an electrical power cable. Power circuitry 2037 may also in certain embodiments be operable to deliver power from an external power source to power source 2036. This may be, for example, for the charging of power source 2036. Power circuitry 2037 may perform any formatting, converting, or other modification to the power from power source 2036 to make the power suitable for the respective components of WD 2010 to which power is supplied.

Figure 21:
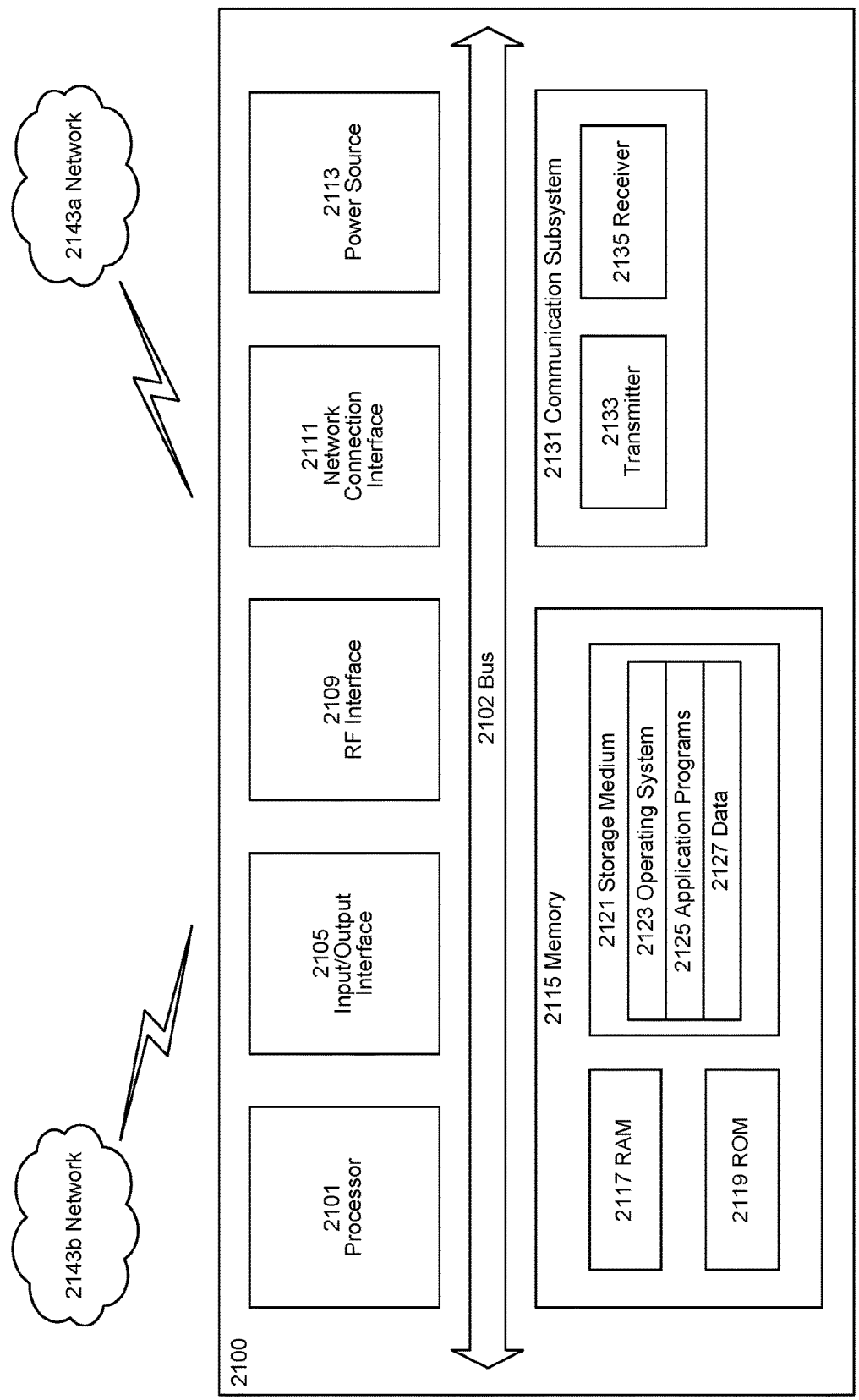
FIG. 21 is a block diagram of a user equipment according to some embodiments.

FIG. 21 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 21200 may be any UE identified by the $3^{rd}$ Generation Partnership Project (3GPP), including a NB-IoT UE, a machine type communication (MTC) UE, and/or an enhanced MTC (eMTC) UE. UE 2100, as illustrated in FIG. 21, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE 2100 includes processing circuitry 2101 that is operatively coupled to input/output interface 2105, radio frequency (RF) interface 2109, network connection interface 2111, memory 2115 including random access memory (RAM) 2117, read-only memory (ROM) 2119, and storage medium 2121 or the like, communication subsystem 2131, power source 2133, and/or any other component, or any combination thereof. Storage medium 2121 includes operating system 2123, application program 2125, and data 2127. In other embodiments, storage medium 2121 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry 2101 may be configured to process computer instructions and data. Processing circuitry 2101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2101 may include two central processing units (CPUs). Data may be information in a form suitable for use by a computer.

In the depicted embodiment, input/output interface 2105 may be configured to provide a communication interface to an input device, output device, or input and output device. UE 2100 may be configured to use an output device via input/output interface 2105. An output device may use the same type of interface port as an input device. For example, a USB port may be used to provide input to and output from UE 2100. The output device may be a speaker, a sound card, a video card, a display, a monitor, a printer, an actuator, an emitter, a smartcard, another output device, or any combination thereof. UE 2100 may be configured to use an input device via input/output interface 2105 to allow a user to capture information into UE 2100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface 2109 may be configured to provide a communication interface to RF components such as a transmitter, a receiver, and an antenna. Network connection interface 2111 may be configured to provide a communication interface to network 2143a. Network 2143a may encompass wired and/or wireless networks such as a local-area network (LAN), a wide-area network (WAN), a computer network, a wireless network, a telecommunications network, another like network or any combination thereof. For example, network 2143a may comprise a Wi-Fi network. Network connection interface 2111 may be configured to include a receiver and a transmitter interface used to communicate with one or more other devices over a communication network according to one or more communication protocols, such as Ethernet, TCP/IP, SONET, ATM, or the like. Network connection interface 2111 may implement receiver and transmitter functionality appropriate to the communication network links (e.g., optical, electrical, and the like). The transmitter and receiver functions may share circuit components, software or firmware, or alternatively may be implemented separately.

RAM 2117 may be configured to interface via bus 2102 to processing circuitry 2101 to provide storage or caching of data or computer instructions during the execution of software programs such as the operating system, application programs, and device drivers. ROM 2119 may be configured to provide computer instructions or data to processing circuitry 2101. For example, ROM 2119 may be configured to store invariant low-level system code or data for basic system functions such as basic input and output (I/O), startup, or reception of keystrokes from a keyboard that are stored in a non-volatile memory. Storage medium 2121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2121 may be configured to include operating system 2123, application program 2125 such as a web browser application, a widget or gadget engine or another application, and data file 2127. Storage medium 2121 may store, for use by UE 2100, any of a variety of various operating systems or combinations of operating systems.

Storage medium 2121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2121 may allow UE 2100 to access computer-executable instructions, application programs or the like, stored on transitory or non-transitory memory media, to off-load data, or to upload data. An article of manufacture, such as one utilizing a communication system may be tangibly embodied in storage medium 2121, which may comprise a device readable medium.

In FIG. 21, processing circuitry 2101 may be configured to communicate with network 2143b using communication subsystem 2131. Network 2143a and network 2143b may be the same network or networks or different network or networks. Communication subsystem 2131 may be configured to include one or more transceivers used to communicate with network 2143b. For example, communication subsystem 2131 may be configured to include one or more transceivers used to communicate with one or more remote transceivers of another device capable of wireless communication such as another WD, UE, or base station of a radio access network (RAN) according to one or more communication protocols, such as IEEE 802.21, CDMA, WCDMA, GSM, LTE, UTRAN, WiMax, or the like. Each transceiver may include transmitter 2133 and/or receiver 2135 to implement transmitter or receiver functionality, respectively, appropriate to the RAN links (e.g., frequency allocations and the like). Further, transmitter 2133 and receiver 2135 of each transceiver may share circuit components, software or firmware, or alternatively may be implemented separately.

In the illustrated embodiment, the communication functions of communication subsystem 2131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2131 may include cellular communication, Wi-Fi communication, Bluetooth communication, and GPS communication. Network 2143b may encompass wired and/or wireless networks such as a local-area network (LAN), a wide-area network (WAN), a computer network, a wireless network, a telecommunications network, another like network or any combination thereof. For example, network 2143b may be a cellular network, a Wi-Fi network, and/or a near-field network. Power source 2113 may be configured to provide alternating current (AC) or direct current (DC) power to components of UE 2100.

The features, benefits and/or functions described herein may be implemented in one of the components of UE 2100 or partitioned across multiple components of UE 2100. Further, the features, benefits, and/or functions described herein may be implemented in any combination of hardware, software or firmware. In one example, communication subsystem 2131 may be configured to include any of the components described herein. Further, processing circuitry 2101 may be configured to communicate with any of such components over bus 2102. In another example, any of such components may be represented by program instructions stored in memory that when executed by processing circuitry 2101 perform the corresponding functions described herein. In another example, the functionality of any of such components may be partitioned between processing circuitry 2101 and communication subsystem 2131. In another example, the non-computationally intensive functions of any of such components may be implemented in software or firmware and the computationally intensive functions may be implemented in hardware.

Figure 22:
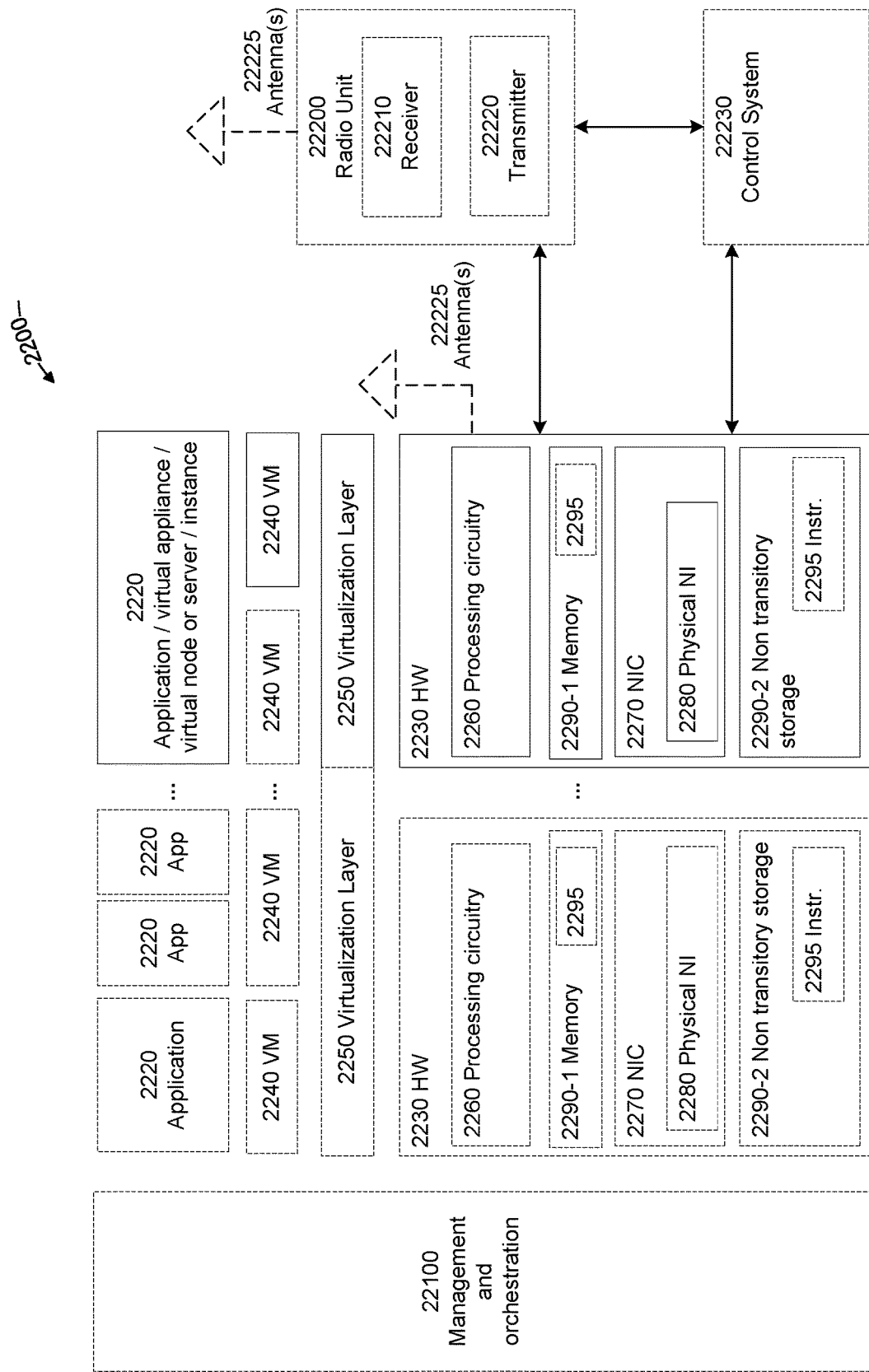
FIG. 22 is a block diagram of a virtualization environment according to some embodiments.

FIG. 22 is a schematic block diagram illustrating a virtualization environment 2200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2200 hosted by one or more of hardware nodes 2230. Further, in embodiments in which the virtual node is not a radio access node or does not require radio connectivity (e.g., a core network node), then the network node may be entirely virtualized.

The functions may be implemented by one or more applications 2220 (which may alternatively be called software instances, virtual appliances, network functions, virtual nodes, virtual network functions, etc.) operative to implement some of the features, functions, and/or benefits of some of the embodiments disclosed herein. Applications 2220 are run in virtualization environment 2200 which provides hardware 2230 comprising processing circuitry 2260 and memory 2290. Memory 2290 contains instructions 2295 executable by processing circuitry 2260 whereby application 2220 is operative to provide one or more of the features, benefits, and/or functions disclosed herein.

Virtualization environment 2200, comprises general-purpose or special-purpose network hardware devices 2230 comprising a set of one or more processors or processing circuitry 2260, which may be commercial off-the-shelf (COTS) processors, dedicated Application Specific Integrated Circuits (ASICs), or any other type of processing circuitry including digital or analog hardware components or special purpose processors. Each hardware device may comprise memory 2290-1 which may be non-persistent memory for temporarily storing instructions 2295 or software executed by processing circuitry 2260. Each hardware device may comprise one or more network interface controllers (NICs) 2270, also known as network interface cards, which include physical network interface 2280. Each hardware device may also include non-transitory, persistent, machine-readable storage media 2290-2 having stored therein software 2295 and/or instructions executable by processing circuitry 2260. Software 2295 may include any type of software including software for instantiating one or more virtualization layers 2250 (also referred to as hypervisors), software to execute virtual machines 2240 as well as software allowing it to execute functions, features and/or benefits described in relation with some embodiments described herein.

Virtual machines 2240, comprise virtual processing, virtual memory, virtual networking or interface and virtual storage, and may be run by a corresponding virtualization layer 2250 or hypervisor. Different embodiments of the instance of virtual appliance 2220 may be implemented on one or more of virtual machines 2240, and the implementations may be made in different ways.

During operation, processing circuitry 2260 executes software 2295 to instantiate the hypervisor or virtualization layer 2250, which may sometimes be referred to as a virtual machine monitor (VMM). Virtualization layer 2250 may present a virtual operating platform that appears like networking hardware to virtual machine 2240.

As shown in FIG. 22, hardware 2230 may be a standalone network node with generic or specific components. Hardware 2230 may comprise antenna 22225 and may implement some functions via virtualization. Alternatively, hardware 2230 may be part of a larger cluster of hardware (e.g. such as in a data center or customer premise equipment (CPE)) where many hardware nodes work together and are managed via management and orchestration (MANO) 22100, which, among others, oversees lifecycle management of applications 2220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2240 may be a software implementation of a physical machine that runs programs as if they were executing on a physical, non-virtualized machine. Each of virtual machines 2240, and that part of hardware 2230 that executes that virtual machine, be it hardware dedicated to that virtual machine and/or hardware shared by that virtual machine with others of the virtual machines 2240, forms a separate virtual network elements (VNE).

Still in the context of NFV, Virtual Network Function (VNF) is responsible for handling specific network functions that run in one or more virtual machines 2240 on top of hardware networking infrastructure 2230 and corresponds to application 2220 in FIG. 22.

In some embodiments, one or more radio units 22200 that each include one or more transmitters 22220 and one or more receivers 22210 may be coupled to one or more antennas 22225. Radio units 22200 may communicate directly with hardware nodes 2230 via one or more appropriate network interfaces and may be used in combination with the virtual components to provide a virtual node with radio capabilities, such as a radio access node or a base station.

In some embodiments, some signalling can be effected with the use of control system 22230 which may alternatively be used for communication between the hardware nodes 2230 and radio units 22200.

Figure 23:
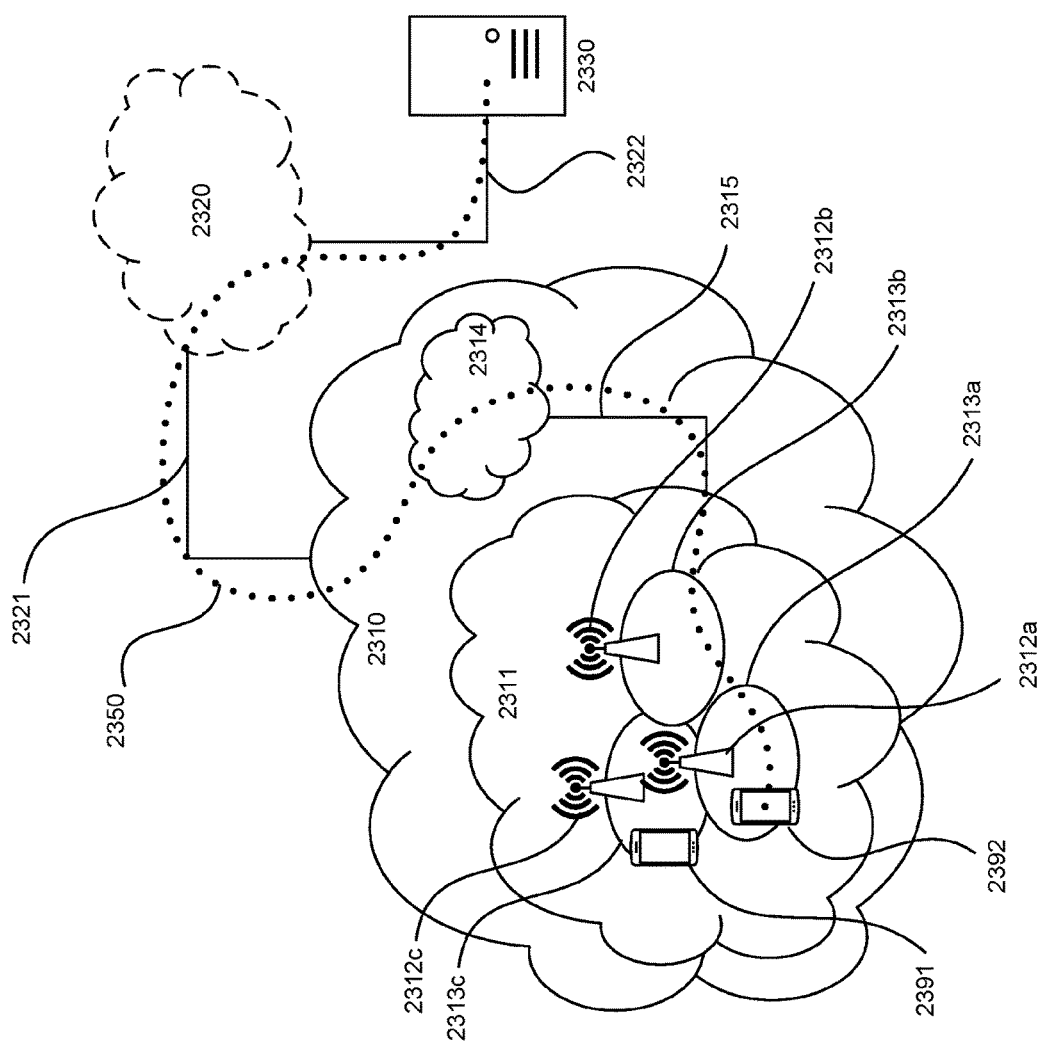
FIG. 23 is a block diagram of a communication network with a host computer according to some embodiments.

FIG. 23 illustrates a telecommunication network connected via an intermediate network to a host computer in accordance with some embodiments. In particular, with reference to FIG. 23, in accordance with an embodiment, a communication system includes telecommunication network 2310, such as a 3GPP-type cellular network, which comprises access network 2311, such as a radio access network, and core network 2314. Access network 2311 comprises a plurality of base stations 2312a, 2312b, 2312c, such as NBs, eNBs, gNBs or other types of wireless access points, each defining a corresponding coverage area 2313a, 2313b, 2313c. Each base station 2312a, 2312b, 2312c is connectable to core network 2314 over a wired or wireless connection 2315. A first UE 2391 located in coverage area 2313c is configured to wirelessly connect to, or be paged by, the corresponding base station 2312c. A second UE 2392 in coverage area 2313a is wirelessly connectable to the corresponding base station 2312a. While a plurality of UEs 2391, 2392 are illustrated in this example, the disclosed embodiments are equally applicable to a situation where a sole UE is in the coverage area or where a sole UE is connecting to the corresponding base station 2312.

Telecommunication network 2310 is itself connected to host computer 2330, which may be embodied in the hardware and/or software of a standalone server, a cloud-implemented server, a distributed server or as processing resources in a server farm. Host computer 2330 may be under the ownership or control of a service provider, or may be operated by the service provider or on behalf of the service provider. Connections 2321 and 2322 between telecommunication network 2310 and host computer 2330 may extend directly from core network 2314 to host computer 2330 or may go via an optional intermediate network 2320. Intermediate network 2320 may be one of, or a combination of more than one of, a public, private or hosted network; intermediate network 2320, if any, may be a backbone network or the Internet; in particular, intermediate network 2320 may comprise two or more sub-networks (not shown).

The communication system of FIG. 23 as a whole enables connectivity between the connected UEs 2391, 2392 and host computer 2330. The connectivity may be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 may be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

Figure 24:
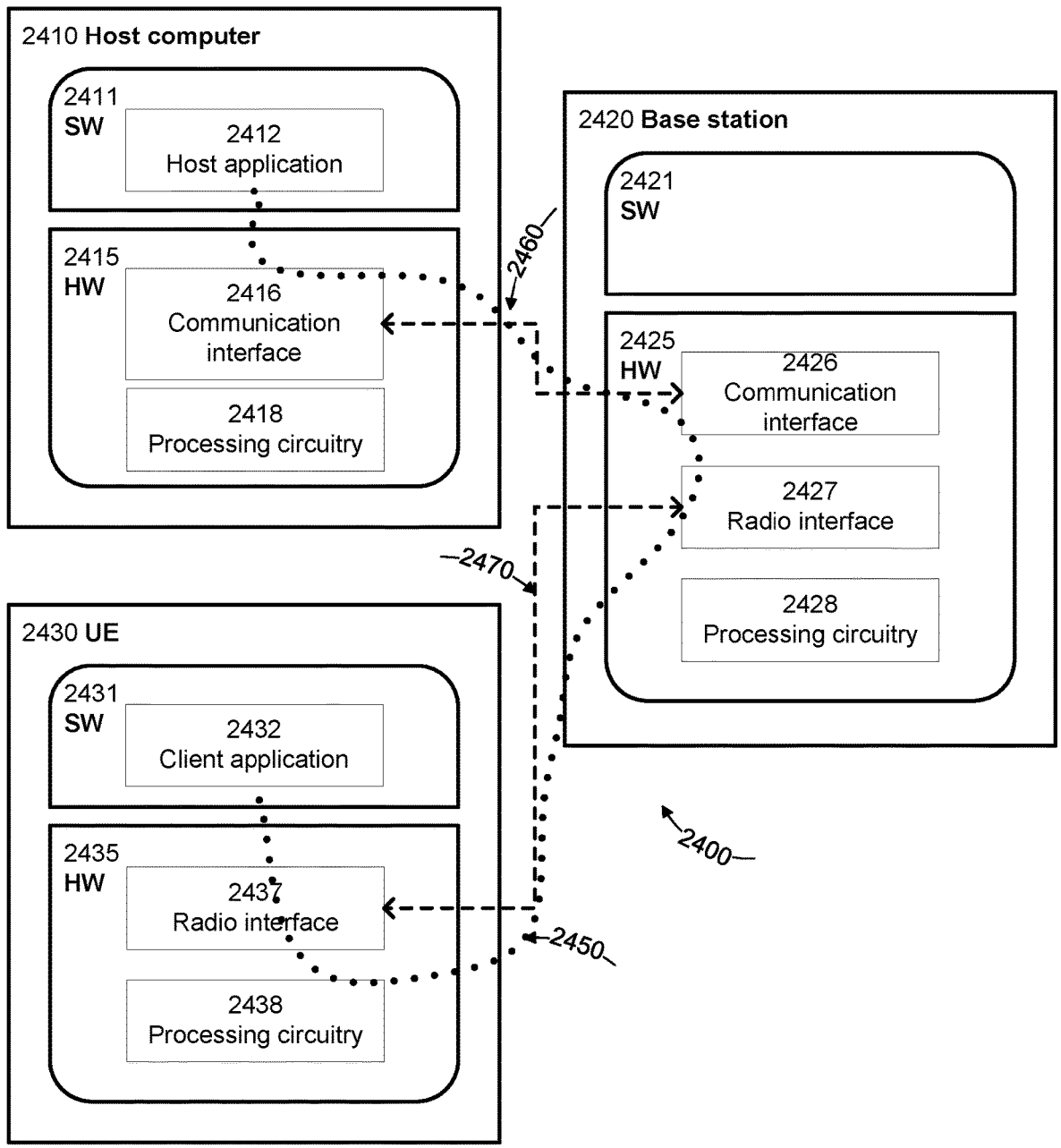
FIG. 24 is a block diagram of a host computer according to some embodiments.

Example implementations, in accordance with an embodiment, of the UE, base station and host computer discussed in the preceding paragraphs will now be described with reference to FIG. 24. FIG. 24 illustrates host computer communicating via a base station with a user equipment over a partially wireless connection in accordance with some embodiments In communication system 2400, host computer 2410 comprises hardware 2415 including communication interface 2416 configured to set up and maintain a wired or wireless connection with an interface of a different communication device of communication system 2400. Host computer 2410 further comprises processing circuitry 2418, which may have storage and/or processing capabilities. In particular, processing circuitry 2418 may comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 may be operable to provide a service to a remote user, such as UE 2430 connecting via OTT connection 2450 terminating at UE 2430 and host computer 2410. In providing the service to the remote user, host application 2412 may provide user data which is transmitted using OTT connection 2450.

Communication system 2400 further includes base station 2420 provided in a telecommunication system and comprising hardware 2425 enabling it to communicate with host computer 2410 and with UE 2430. Hardware 2425 may include communication interface 2426 for setting up and maintaining a wired or wireless connection with an interface of a different communication device of communication system 2400, as well as radio interface 2427 for setting up and maintaining at least wireless connection 2470 with UE 2430 located in a coverage area (not shown in FIG. 24) served by base station 2420. Communication interface 2426 may be configured to facilitate connection 2460 to host computer 2410. Connection 2460 may be direct or it may pass through a core network (not shown in FIG. 24) of the telecommunication system and/or through one or more intermediate networks outside the telecommunication system. In the embodiment shown, hardware 2425 of base station 2420 further includes processing circuitry 2428, which may comprise one or more programmable processors, application-specific integrated circuits, field programmable gate arrays or combinations of these (not shown) adapted to execute instructions. Base station 2420 further has software 2421 stored internally or accessible via an external connection.

Communication system 2400 further includes UE 2430 already referred to. Its hardware 2435 may include radio interface 2437 configured to set up and maintain wireless connection 2470 with a base station serving a coverage area in which UE 2430 is currently located. Hardware 2435 of UE 2430 further includes processing circuitry 2438, which may comprise one or more programmable processors, application-specific integrated circuits, field programmable gate arrays or combinations of these (not shown) adapted to execute instructions. UE 2430 further comprises software 2431, which is stored in or accessible by UE 2430 and executable by processing circuitry 2438. Software 2431 includes client application 2432. Client application 2432 may be operable to provide a service to a human or non-human user via UE 2430, with the support of host computer 2410. In host computer 2410, an executing host application 2412 may communicate with the executing client application 2432 via OTT connection 2450 terminating at UE 2430 and host computer 2410. In providing the service to the user, client application 2432 may receive request data from host application 2412 and provide user data in response to the request data. OTT connection 2450 may transfer both the request data and the user data. Client application 2432 may interact with the user to generate the user data that it provides.

It is noted that host computer 2410, base station 2420 and UE 2430 illustrated in FIG. 24 may be similar or identical to host computer 2330, one of base stations 2312*a*, 2312*b*, 2312*c* and one of UEs 2391, 2392 of FIG. 23, respectively. This is to say, the inner workings of these entities may be as shown in FIG. 24 and independently, the surrounding network topology may be that of FIG. 23.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure may determine the routing, which it may be configured to hide from UE 2430 or from the service provider operating host computer 2410, or both. While OTT connection 2450 is active, the network infrastructure may further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments improve the performance of OTT services provided to UE 2430 using OTT connection 2450, in which wireless connection 2470 forms the last segment. More precisely, the teachings of these embodiments may improve the flexibility of T312 configuration and reduce delay in connection re-establishment and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 2450 between host computer 2410 and UE 2430, in response to variations in the measurement results. The measurement procedure and/or the network functionality for reconfiguring OTT connection 2450 may be implemented in software 2411 and hardware 2415 of host computer 2410 or in software 2431 and hardware 2435 of UE 2430, or both. In embodiments, sensors (not shown) may be deployed in or in association with communication devices through which OTT connection 2450 passes; the sensors may participate in the measurement procedure by supplying values of the monitored quantities exemplified above, or supplying values of other physical quantities from which software 2411, 2431 may compute or estimate the monitored quantities. The reconfiguring of OTT connection 2450 may include message format, retransmission settings, preferred routing etc.; the reconfiguring need not affect base station 2420, and it may be unknown or imperceptible to base station 2420. Such procedures and functionalities may be known and practiced in the art. In certain embodiments, measurements may involve proprietary UE signaling facilitating host computer 2410's measurements of throughput, propagation times, latency and the like. The measurements may be implemented in that software 2411 and 2431 causes messages to be transmitted, in particular empty or 'dummy' messages, using OTT connection 2450 while it monitors propagation times, errors etc.

Figure 25:
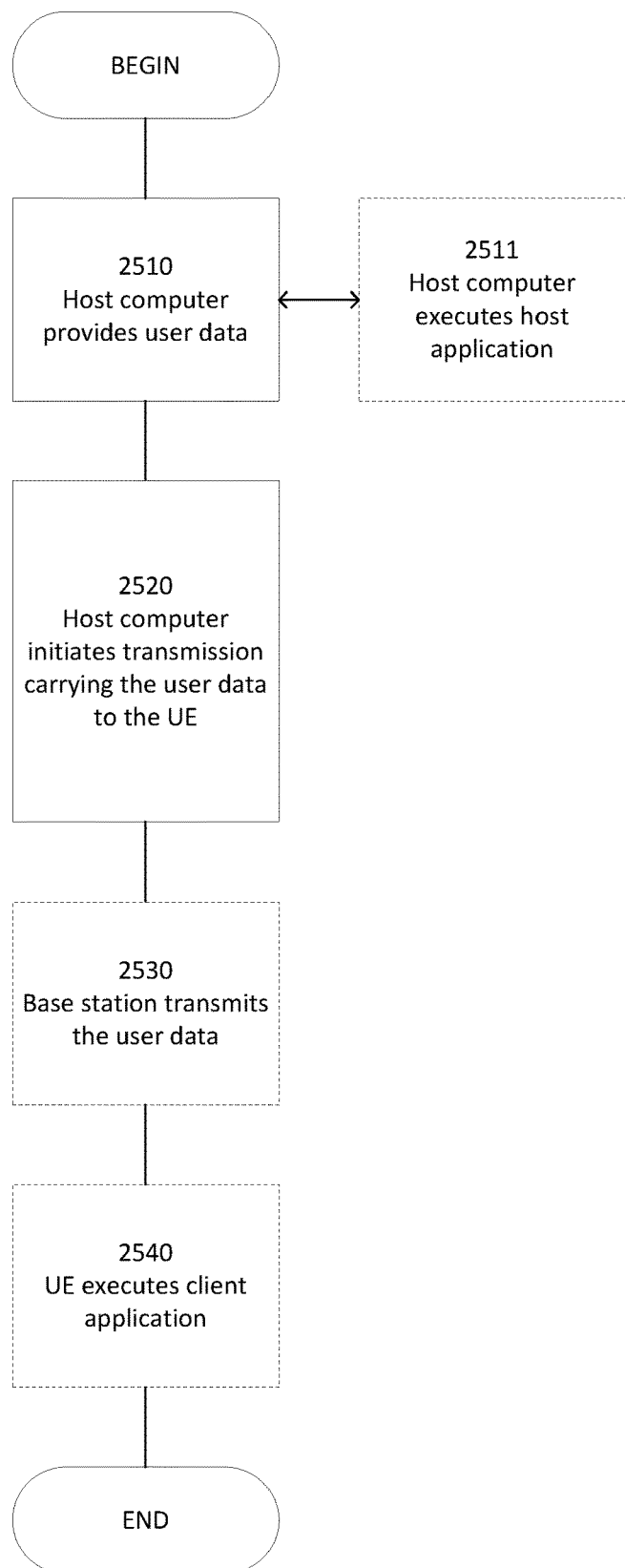
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step 2510, the host computer provides user data. In substep 2511 (which may be optional) of step 2510, the host computer provides the user data by executing a host application. In step 2520, the host computer initiates a transmission carrying the user data to the UE. In step 2530 (which may be optional), the base station transmits to the UE the user data which was carried in the transmission that the host computer initiated, in accordance with the teachings of the embodiments described throughout this disclosure. In step 2540 (which may also be optional), the UE executes a client application associated with the host application executed by the host computer.

Figure 26:
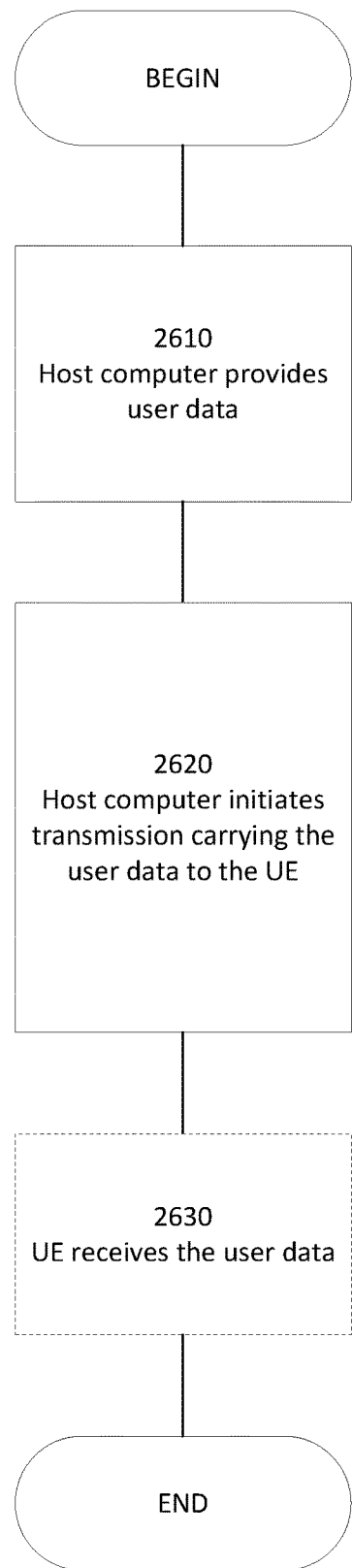
FIG. 26 is a flowchart illustrating a method implemented in a communication system, in accordance with one embodiment.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission may pass via the base station, in accordance with the teachings of the embodiments described throughout this disclosure. In step 2630 (which may be optional), the UE receives the user data carried in the transmission.

Figure 27:
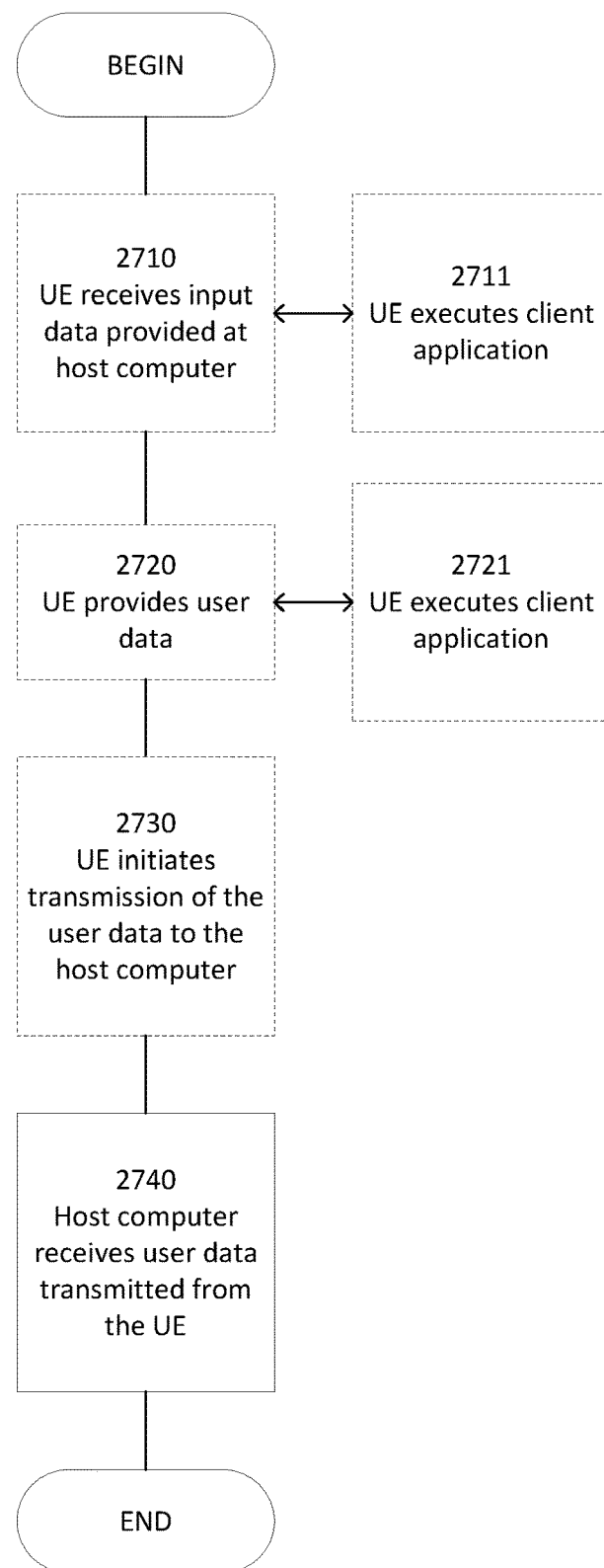
FIG. 27 is a flowchart illustrating a method implemented in a communication system, in accordance with one embodiment.

FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 2710 (which may be optional), the UE receives input data provided by the host computer. Additionally or alternatively, in step 2720, the UE provides user data. In substep 2721 (which may be optional) of step 2720, the UE provides the user data by executing a client application. In substep 2711 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 2730 (which may be optional), transmission of the user data to the host computer. In step 2740 of the method, the host computer receives the user data transmitted from the UE, in accordance with the teachings of the embodiments described throughout this disclosure.

Figure 28:
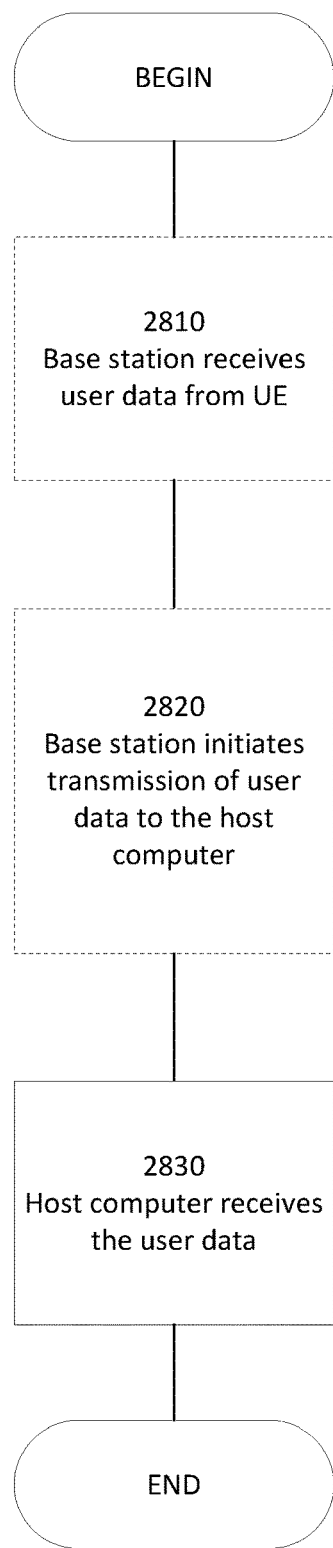
FIG. 28 is a flowchart illustrating a method implemented in a communication system, in accordance with one embodiment.

FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 2810 (which may be optional), in accordance with the teachings of the embodiments described throughout this disclosure, the base station receives user data from the UE. In step 2820 (which may be optional), the base station initiates transmission of the received user data to the host computer. In step 2830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device configured for use in a wireless communication system, the method comprising:
    receiving configuration information that configures a timer to start when each of multiple conditions have been fulfilled and physical layer problems for a serving cell have been detected, wherein the multiple conditions have been fulfilled when one or more events have been triggered for measurements of multiple different types and/or for measurements on multiple different types of signals, wherein triggering of the one or more events for measurements of multiple different types and/or for measurements on multiple types of signals triggers the wireless device to send multiple measurement reports, wherein the configuration information includes a measurement configuration, wherein the measurement configuration indicates a combination of reporting configurations for which the timer is applicable, wherein the reporting configurations in the combination configure triggering of respective ones of the multiple measurement reports;
    starting the timer when each of the multiple conditions have been fulfilled and physical layer problems for the serving cell of the wireless device have been detected; and
    initiating a connection re-establishment procedure, or transitioning to an idle state, at expiry of the timer.

2. The method of claim 1, wherein the measurements of multiple different types include two or more of: a signal power measurement, a signal quality measurement, and a signal-to-interference-plus-noise measurement.

3. The method of claim 1, wherein the one or more events include one or more of:
    an event in which a measurement becomes better or worse than an absolute threshold;
    an event in which a measurement on one cell becomes an amount of an offset better than the same measurement on another cell; and
    an event in which a measurement on one cell becomes worse than an absolute threshold and the same measurement on another cell becomes better than another absolute threshold.

4. The method of claim 1, wherein the one or more events comprise one or more measurement reporting events.

5. The method of claim 1, wherein triggering of the one or more events for measurements of multiple different types and/or for measurements on multiple types of signals comprises triggering of multiple measurement reports.

6. The method of claim 1, wherein starting the timer comprises:
    starting the timer upon one of the multiple conditions being fulfilled and each of the others of the multiple conditions having already been fulfilled and physical layer problems for the serving cell already having been detected; or
    starting the timer upon physical layer problems for the serving cell being detected and each of the multiple conditions having already been fulfilled.

7. The method of claim 1, wherein an out-of-sync timer at the wireless device is to be started when physical layer problems for the serving cell have been detected, and wherein starting a timer comprises starting a timer when each of multiple conditions have been fulfilled and the out-of-sync timer is running.

8. The method of claim 1, wherein the timer is configured to be stopped upon physical layer problems for the serving cell having been resolved, upon triggering a handover procedure, upon initiating a connection re-establishment procedure, or upon a expiry of a timer started when physical layer problems for the serving cell have been detected.

9. The method of claim 1, wherein the wireless communication system is a 5G system or a New Radio (NR) system.

10. A method performed by a network node configured for use in a wireless communication system, the method comprising:
    transmitting, to a wireless device, configuration information that configures a timer at the wireless device to start when each of multiple conditions have been fulfilled at the wireless device and physical layer problems for a serving cell of the wireless device have been detected by the wireless device, wherein the multiple conditions have been fulfilled when one or more events have been triggered for measurements of multiple different types and/or for measurements on multiple different types of signals, wherein triggering of the one or more events for measurements of multiple different types and/or for measurements on multiple types of signals triggers the wireless device to send multiple measurement reports, wherein the configuration information includes a measurement configuration, wherein the measurement configuration indicates a combination of reporting configurations for which the timer is applicable, wherein the reporting configurations in the combination configure triggering of respective ones of the multiple measurement reports; and receiving a connection re-establishment request at expiry of the timer.

11. The method of claim 10, wherein the measurements of multiple different types include two or more of: a signal power measurement, a signal quality measurement, and a signal-to-interference-plus-noise measurement.

12. The method of claim 10, wherein the multiple measurement reports report measurements of different types of signals.

13. The method of claim 10, wherein the one or more events include one or more of:
an event in which a measurement becomes better or worse than an absolute threshold;
an event in which a measurement on one cell becomes an amount of an offset better than the same measurement on another cell; and
an event in which a measurement on one cell becomes worse than an absolute threshold and the same measurement on another cell becomes better than another absolute threshold.

14. The method of claim 10, wherein the one or more events comprise one or more measurement reporting events.

15. The method of claim 10, wherein an out-of-sync timer at the wireless device is to be started when physical layer problems for the serving cell have been detected, and wherein the configuration information configures the timer to start when each of multiple conditions have been fulfilled and the out-of-sync timer is running.

16. The method of claim 10, wherein the wireless communication system is a 5G system or a New Radio (NR) system.

17. A wireless device configured for use in a wireless communication system, wherein the wireless device comprising:
communication circuitry; and
processing circuitry configured to:
receive configuration information that configures a timer to start when each of multiple conditions have been fulfilled and physical layer problems for a serving cell have been detected, wherein the multiple conditions have been fulfilled when one or more events have been triggered for measurements of multiple different types and/or for measurements on multiple different types of signals, wherein triggering of the one or more events for measurements of multiple different types and/or for measurements on multiple types of signals triggers the wireless device to send multiple measurement reports, wherein the configuration information includes a measurement configuration, wherein the measurement configuration indicates a combination of reporting configurations for which the timer is applicable, wherein the reporting configurations in the combination configure triggering of respective ones of the multiple measurement reports;
start the timer when each of the multiple conditions have been fulfilled and physical layer problems for the serving cell of the wireless device have been detected; and
initiate a connection re-establishment procedure, or transitioning to an idle state, at expiry of the timer.

18. The wireless device of claim 17, wherein the measurements of multiple different types include two or more of: a signal power measurement, a signal quality measurement, and a signal-to-interference-plus-noise measurement.

19. A network node configured for use in a wireless communication system, wherein the network node comprises:
communication circuitry; and
processing circuitry configured to:
transmit, to a wireless device, configuration information that configures a timer at the wireless device to start when each of multiple conditions have been fulfilled at the wireless device and physical layer problems for a serving cell of the wireless device have been detected by the wireless device, wherein the multiple conditions have been fulfilled when one or more events have been triggered for measurements of multiple different types and/or for measurements on multiple different types of signals, wherein triggering of the one or more events for measurements of multiple different types and/or for measurements on multiple types of signals triggers the wireless device to send multiple measurement reports, wherein the configuration information includes a measurement configuration, wherein the measurement configuration indicates a combination of reporting configurations for which the timer is applicable, wherein the reporting configurations in the combination configure triggering of respective ones of the multiple measurement reports; and
receive a connection re-establishment request at expiry of the timer.

20. The network node of claim 19, wherein the measurements of multiple different types include two or more of: a signal power measurement, a signal quality measurement, and a signal-to-interference-plus-noise measurement.

* * * * *